United States Patent
Fujita et al.

(10) Patent No.: US 11,364,707 B2
(45) Date of Patent: Jun. 21, 2022

(54) OVERLAPPED BLANK FOR HOT STAMPING, METHOD OF MANUFACTURING OVERLAPPED HOT STAMP MOLDED BODY, AND OVERLAPPED HOT STAMP MOLDED BODY

(71) Applicant: NIPPON STEEL CORPORATION, Tokyo (JP)

(72) Inventors: Soshi Fujita, Tokyo (JP); Yuki Suzuki, Tokyo (JP); Masahiro Fuda, Tokyo (JP); Jun Maki, Tokyo (JP); Hideaki Irikawa, Tokyo (JP); Masahiro Nakata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/613,981

(22) PCT Filed: Apr. 5, 2019

(86) PCT No.: PCT/JP2019/015180
§ 371 (c)(1),
(2) Date: Nov. 15, 2019

(87) PCT Pub. No.: WO2019/194308
PCT Pub. Date: Oct. 10, 2019

(65) Prior Publication Data
US 2021/0197525 A1    Jul. 1, 2021

(30) Foreign Application Priority Data
Apr. 6, 2018 (JP) .............................. JP2018-074025

(51) Int. Cl.
| | |
|---|---|
| *B23K 31/02* | (2006.01) |
| *B32B 15/01* | (2006.01) |
| *B21D 22/02* | (2006.01) |
| *C23C 2/12* | (2006.01) |

(52) U.S. Cl.
CPC .......... *B32B 15/012* (2013.01); *B21D 22/022* (2013.01); *B23K 31/02* (2013.01); *C23C 2/12* (2013.01)

(58) Field of Classification Search
None
See application file for complete search history.

(56) References Cited

U.S. PATENT DOCUMENTS 11,198,195 B2 * 12/2021 Evangelista ........... B23K 26/60

FOREIGN PATENT DOCUMENTS

| CN | 1117884 C | 8/2003 |
|---|---|---|
| CN | 107000020 A | 8/2017 |

(Continued)

OTHER PUBLICATIONS

Taiwanese Office Action and Search Report for corresponding Taiwanese Application No. 108112137, dated Oct. 1, 2019.

(Continued)

*Primary Examiner* — Daniel J. Schleis
(74) *Attorney, Agent, or Firm* — Birch, Stewart, Kolasch & Birch, LLP

(57) ABSTRACT

To solve the problem about the difference in temperature increasing rate between an overlapped part and a one-sheet part so as to further improve the corrosion resistance of plating after hot stamping. An overlapped blank for hot stamping includes: a first steel sheet; and at least one second steel sheet connected to a surface of the first steel sheet via a welding point and smaller in area than the first steel sheet, wherein: the first steel sheet is a plated steel sheet having an aluminum-based plated layer on both faces of the first steel sheet, and the second steel sheet is a plated steel sheet having an aluminum-based plated layer on both faces of the second steel sheet; a coating weight of the aluminum-based plated layer on the first steel sheet is W1 (g/m$^2$) in terms of an (Continued)

average coating weight on both the faces; a coating weight of the aluminum-based plated layer on a surface on a side not in contact with the first steel sheet in the second steel sheet is W2 ($g/m^2$); and each of the W1 and the W2 is within a range of 20 $g/m^2$ or more and 120 $g/m^2$ or less, and satisfies relationships of Expression (1) and Expression (2).

15 Claims, 4 Drawing Sheets

(56) References Cited

FOREIGN PATENT DOCUMENTS

| EP | 3 231 525 A1 | 10/2017 |
|---|---|---|
| JP | 100370054 C | 2/2008 |
| JP | 2011-88484 A | 5/2011 |
| JP | 2014-124673 A | 7/2014 |
| JP | 2016-124029 A | 7/2016 |
| JP | 2017-29987 A | 2/2017 |
| JP | 6178301 B2 | 8/2017 |
| TW | 201243106 A1 | 11/2012 |
| WO | WO 02/103073 A2 | 12/2002 |

OTHER PUBLICATIONS

International Search Report for PCT/JP2019/015180 dated Jul. 16, 2019.
Written Opinion of the International Searching Authority for PCT/JP2019/015180 (PCT/ISA/237) dated Jul. 16, 2019.

* cited by examiner

OVERLAPPED BLANK FOR HOT STAMPING, METHOD OF MANUFACTURING OVERLAPPED HOT STAMP MOLDED BODY, AND OVERLAPPED HOT STAMP MOLDED BODY

TECHNICAL FIELD

The present invention relates to an overlapped blank for hot stamping, a method of manufacturing an overlapped hot stamp molded body, and an overlapped hot stamp molded body.

BACKGROUND ART

In recent years, a steel sheet achieving both high strength and high moldability is demanded in a use of a steel sheet for an automobile, and one example corresponding to the steel sheet achieving both high strength and high moldability is a TRIP (Transformation Induced Plasticity) steel using martensite transformation of retained austenite. A high-strength steel sheet excellent in moldability and having a strength of about 1000 MPa class can be manufactured with the TRIP steel. However, it is difficult to ensure the moldability in ultrahigh-strength steel having higher strength (for example, 1500 MPa or more) using the technique of the TRIP steel, and there is a problem of poor shape fixability after molding and inferiority in dimensional accuracy of a molded product.

In contrast to the construction method of molding near room temperature (so-called cold press construction method) as mentioned above, a construction method recently attracting attention is hot stamping (also called hot press, hot pressing, die-quenching, press quenching and so on). This hot stamping is a method of manufacturing a part to obtain a material quality of a desired high strength after pressing by heating a steel sheet up to an Ac3 point or higher (for example, 800° C. or higher) to make it into austenite and immediately thereafter pressing it in a hot state to thereby ensure the moldability, and rapidly cooling it down to an Ms point or lower (for example, 400° C. or lower) by a metal mold during keeping it at a bottom dead center to make the material into martensite to thereby quench it. By this construction method, an automobile part excellent also in shape fixability after molding can be obtained.

On the other hand, various press-molded bodies used for parts constituting the vehicle body of the automobile are required to be improved in a wide variety of performances and characteristics from the various viewpoints such as static strength, dynamic strength, collision safety, and weight saving. For example, an automobile part such as A-pillar reinforce, B-pillar reinforce, bumper reinforce, tunnel reinforce, side sill reinforce, roof reinforce, floor reinforce, or floor cross member is required to have collision resistant property only at a specific site of each automobile part more than a general site except the specific site.

Hence, a construction method of overlapping and welding a plurality of steel sheets only at a portion corresponding to the specific site requiring reinforcement of the automobile part and then hot stamp molding the obtained steel sheet to manufacture an overlapped hot stamp molded body is actually employed from about 2007 (refer to Patent Document 1 and Patent Document 2). This construction method can partially reinforce only the specific site of the overlapped hot stamp molded body while reducing the number of press metal molds, and can contribute also to a reduction in weight of the part because the part thickness is not unnecessarily increased. Note that the blank produced by overlapping and welding them as explained above is called an overlapped blank (also called a patch work blank). Note that the blank means a metal sheet such as a steel sheet which is a material of molding process including pressing.

In the case where the steel sheets to be overlapped are non-plated steel sheets, oxide scale is generated on the surface of an overlapped hot-pressed member to be manufactured due to high-temperature heating accompanying the hot press molding. Therefore, a problem is that there is a necessity of removing the generated oxide scale, for example, by shot blast processing after the hot press molding or that the corrosion resistance of the manufactured overlapped hot-pressed member is likely to decrease. Further, a problem peculiar to the case of using the non-plated steel sheet as the raw material of the overlapped blank is that a non-overlapped portion (hereinafter, also called "one-sheet part") can be subjected to shot blast processing but removal of the oxide scale formed between steel sheets at an overlapped portion (hereinafter also called "overlapped part") by the shot blast processing is difficult, and particularly the corrosion resistance is likely to decrease.

If the steel sheets to be overlapped are plated steel sheets, the necessity of performing the shot blast processing on the overlapped hot-pressed member after the hot press molding is eliminated. General examples of the plated steel sheet used for hot pressing include a Zn-based plated steel sheet and an Al-based plated steel sheet. Regarding both of Zn-based plating and Al-based plating, the Zn-based plating becomes Zn—Fe-based plating and the Al-based plating becomes Al—Fe-based plating after the hot-stamping heating by the alloying reaction of diffusing Fe in the plating.

As described in Patent Document 2 and Patent Document 3, a Zn-based plated steel sheet (namely, a plated steel sheet containing 50 mass % or more of Zn (Zn plating or Zn-based alloy plating of a Zn—Fe alloy, a Zn—Ni alloy, or a Zn—Fe—Al alloy)) suppresses the generation of the oxide scale to eliminate the problem of the necessity of the shot blast processing. However, in the case of using the Zn-based plated steel sheet as the overlapped blank material and performing a bending molding on the overlapped part during the hot stamp molding, cracks occur in a base iron to cause a problem in collision resistant property in some cases. This is because when zinc relatively low in melting point remains, Zn becomes a liquid metal and intrude from the plating surface into the base iron, due to a problem of so-called liquid-metal embrittlement. Note that the bending molding is a means for ensuring the collision resistant property in terms of a shape, and performing the bending molding on the overlapped part is a very important using method of the overlapped molded body.

As described in Patent Document 2 and Patent Document 3, general examples of the measure for the liquid-metal embrittlement employed in the case of using the Zn-based plated steel sheet as the hot stamp include a measure of increasing the melting point of the plating by promoting the Zn—Fe alloying reaction during the hot-stamping heating and a measure of waiting for solidification of zinc by decreasing the molding temperature during the bending molding of the hot stamp. However, a problem peculiar to the case of using the zinc-based plated steel sheet as a raw material of the overlapped blank is a problem of the overlapped part being larger in sheet thickness than the one-sheet part and therefore low in both of the temperature increasing rate and the cooling rate and difficult to promote the Zn—Fe alloying reaction during the hot-stamping heating. Further, regarding the molding temperature during the hot stamp molding, there is a problem of the one-sheet part early cooling when waiting for the overlapped part to cool, failing to ensure the martensite structure. Further, Zn becomes a film of a zinc oxide to suppress the evaporation of Zn at the one-sheet part, but deficiency of oxygen occurs in an atmosphere between the steel sheets at the overlapped part and therefore Zn evaporates, so that the problems in a decrease in corrosion resistance and in liquid-metal embrittlement at the overlapped part become more serious.

An Al-based plated steel sheet as disclosed in Patent Document 4 (namely, a plated steel sheet containing 50 mass % or more of Al (Al plating or Al-based alloy plating of an Al—Si alloy or an Al—Fe—Si alloy)) suppresses the generation of the oxide scale as with Zn to eliminate the problem of the necessity of the shot blast processing and causes no problem in liquid-metal embrittlement, and is thus suitable for use as a raw material of the overlapped blank.

PRIOR ART DOCUMENT

Patent Document

Patent Document 1: Japanese Laid-open Patent Publication No. 2011-88484
Patent Document 2: Japanese Patent No. 6178301
Patent Document 3: Japanese Laid-open Patent Publication No. 2016-124029
Patent Document 4: International Publication No. WO 2002/103073

DISCLOSURE OF THE INVENTION

Problems to be Solved by the Invention

However, in the case of using the Al-based plated steel sheet as disclosed in Patent Document 4 as a raw material of the overlapped blank, there is a problem of a temperature increasing rate of the overlapped part being low in heating during the hot stamping. As described in Patent Document 3, the Al—Fe alloying reaction of the plating proceeding in heating during the hot stamping is important in improvement of the corrosion resistance of the plating. When the temperature increasing rate is low, the alloying reaction does not sufficiently proceed up to the surface, and therefore there is a problem of lowering of the corrosion resistance of the molded product after the hot stamping. As the measure for the problem, it is conceivable to increase the time of heating during the hot stamping to thereby make the alloying reaction proceed, but in this measure, the productivity of the hot stamping decreases and the alloying reaction excessively proceeds at the one-sheet part, resulting in the plating high in Fe concentration, and also in this case, there is a problem of a decrease in corrosion resistance of the plating.

Therefore, to suppress the oxide scale of the base iron and to prevent the problem of liquid-metal embrittlement as explained above, it is desired to improve the corrosion resistance of the plating after the hot stamping by solving the problem about the difference in temperature increasing rate between the overlapped part and the one-sheet part regarding the aluminum-based plated steel sheet suitable for use as a raw material of the overlapped blank for hot stamping.

Hence, the present invention has been made in consideration of the above problems, and an object of the present invention is to solve the problem about the difference in temperature increasing rate between an overlapped part and a one-sheet part when using an aluminum-based plated steel sheet as a raw material so as to provide an overlapped blank for hot stamping, a method of manufacturing an overlapped hot stamp molded body, and an overlapped hot stamp molded body which can further improve the corrosion resistance of plating after hot stamping.

Means for Solving the Problems

The present inventors carried out intensive studies for solving the above problem and focused on the relation between the plating coating weight and the temperature increasing rate of the aluminum-based plated steel sheet and, as a result, have found that the temperature increasing rate increases more as the plating coating weight is smaller. As a characteristic of the temperature increasing rate during hot-stamping heating of the aluminum-based plated steel sheet, regarding the external appearance of the aluminum-based plated steel sheet, the emissivity of the surface in silver gray where the alloying reaction of diffusing Fe in the plating does not proceed is low, whereas the surface after the alloying reaction proceeds up to the surface becomes blackish, resulting in an increase in emissivity of the surface. Therefore, it is considered that as the plating coating weight of promoting the alloying up to the surface is smaller, the surface emissivity becoming high is faster, so that the temperature increasing rate increases.

As a result of investigating the optimum plating coating weight for the problem in the difference in temperature increasing rate between the overlapped part and the one-sheet part of the overlapped blank for hot stamping based on the above knowledge, it is found that it is important to decrease the plating coating weight at the overlapped part where the steel sheet thickness is large and the temperature increasing rate is low and, in contrast, it is important to increase the plating coating weight to decrease the temperature increasing rate at the one-sheet part where the temperature increasing rate is high. More specifically, it has been found that the problem in temperature increasing rate difference between the one-sheet part and the overlapped part can be solved, for example, by spot-welding a steel sheet (second steel sheet) small in area corresponding to the overlapped part to a steel sheet (first steel sheet) large in area being a base of the molded body after hot tamping, in an overlapped blank for hot stamping, and using an aluminum-based plated steel sheet large in plating coating weight as the first steel sheet and using an aluminum-based plated steel sheet small in plating coating weight as the second steel sheet.

The points of the present invention completed based on the above knowledge are as follows.

[1] An overlapped blank for hot stamping includes: a first steel sheet; and at least one second steel sheet connected to a surface of the first steel sheet via a welding point and smaller in area than the first steel sheet, wherein: the first steel sheet is a plated steel sheet having an aluminum-based plated layer on both faces of the first steel sheet, and the second steel sheet is a plated steel sheet having an aluminum-based plated layer on both faces of the second steel sheet; a coating weight of the aluminum-based plated layer on the first steel sheet is W1 (g/m$^2$) in terms of an average coating weight on both the faces; a coating weight of the aluminum-based plated layer on a surface on a side not in contact with the first steel sheet in the second steel sheet is W2 (g/m$^2$); and each of the W1 and the W2 is within a range of 20 g/m$^2$ or more and 120 g/m$^2$ or less, and satisfies relationships of following Expression (1) and Expression (2), $30 \leq (W1 - W2) \leq 100$      Expression (1)

$(W1/W2)^2 \times (t1/t2) \geq 1.5$      Expression (2)

where t1 (mm) is a sheet thickness of the first steel sheet and t2 (mm) is a sheet thickness of the second steel sheet in the Expression (2).

[2] The overlapped blank for hot stamping according to [1], wherein: the welding is spot welding; and a spot density of the spot welding is 1 spot/200 cm² or more.

[3] The overlapped blank for hot stamping according to [2], wherein: the first steel sheet has a portion which becomes a flange part composed only of the first steel sheet after supplied for hot stamp molding; at least a part of an overlapped part of the first steel sheet and the second steel sheet has a portion which becomes a bent part after supplied for the hot stamp molding; and at least one spot of the spot welding exists at the portion which becomes the bent part after the hot stamp molding.

[4] The overlapped blank for hot stamping according to any one of [1] to [3], wherein the sheet thickness t1 (mm) of the first steel sheet and the sheet thickness t2 (mm) of the second steel sheet satisfy a relationship of following Expression (3), $$(t2/t1) \leq 2.0 \quad \text{Expression (3)}.$$

[5] The overlapped blank for hot stamping according to any one of [1] to [4], wherein the aluminum-based plated layer provided on each of the first steel sheet and the second steel sheet has a two-layer structure of an aluminum layer and an aluminum-iron-based alloy layer in order from a surface toward a base material steel sheet, and a thickness d1 (μm) of the aluminum-iron-based alloy layer of the first steel sheet and a thickness d2 (μm) of the aluminum-iron-based alloy layer of the second steel sheet satisfy a relationship of following Expression (4), $$2 \leq (d2-d1) \leq 10 \quad \text{Expression (4)}.$$

[6] The overlapped blank for hot stamping according to any one of [1] to [5], wherein the second steel sheet further includes a carbon-based coating having an emissivity of 0.7 or more on the surface of the aluminum-based plated layer on the side not in contact with the first steel sheet.

[7] The overlapped blank for hot stamping according to any one of [1] to [6], further including a coating composed of at least one of ZnO and TiO₂ and having a coating weight per one face of 0.2 g/m² or more, on the surface of the aluminum-based plated layer located on a surface of the second steel sheet.

[8] A method of manufacturing an overlapped hot stamp molded body, the method includes: heating an overlapped blank for hot stamping, the overlapped blank for hot stamping including: a first steel sheet; and at least one second steel sheet connected to a surface of the first steel sheet via a welding point and smaller in area than the first steel sheet, wherein: the first steel sheet is a plated steel sheet having an aluminum-based plated layer on both faces of the first steel sheet, and the second steel sheet is a plated steel sheet having an aluminum-based plated layer on both faces of the second steel sheet; a coating weight of the aluminum-based plated layer on the first steel sheet is W1 (g/m²) in terms of an average coating weight on both the faces; a coating weight of the aluminum-based plated layer on a surface on a side not in contact with the first steel sheet in the second steel sheet is W2 (g/m²); and each of the W1 and the W2 is within a range of 20 g/m² or more and 120 g/m² or less, and satisfies relationships of following Expression (1) and Expression (2); and in hot stamp molding of molding after the heating, providing a bent part subjected to bending at least a part of an overlapped part of the first steel sheet and the second steel sheet, $$30 \leq (W1-W2) \leq 100 \quad \text{Expression (1)}$$

$$(W1/W2)^2 \times (t1/t2) \geq 1.5 \quad \text{Expression (2)}$$

where t1 (mm) is a sheet thickness of the first steel sheet and t2 (mm) is a sheet thickness of the second steel sheet in the Expression (2).

[9] The method of manufacturing an overlapped hot stamp molded body according to [8], wherein: the welding is spot welding; and a spot density of the spot welding is 1 spot/200 cm² or more.

[10] The method of manufacturing an overlapped hot stamp molded body according to [9], wherein at least one spot of the spot welding exists at a portion which becomes the bent part after the hot stamp molding.

[11] The method of manufacturing an overlapped hot stamp molded body according to any one of [8] to [10], wherein the sheet thickness t1 (mm) of the first steel sheet and the sheet thickness t2 (mm) of the second steel sheet satisfy a relationship of following Expression (3), $$(t2/t1) \leq 2.0 \quad \text{Expression (3)}.$$

[12] The method of manufacturing an overlapped hot stamp molded body according to any one of [8] to [11], wherein the aluminum-based plated layer provided on each of the first steel sheet and the second steel sheet has a two-layer structure of an aluminum layer and an aluminum-iron-based alloy layer in order from a surface toward a base material steel sheet, and a thickness d1 (μm) of the aluminum-iron-based alloy layer of the first steel sheet and a thickness d2 (μm) of the aluminum-iron-based alloy layer of the second steel sheet satisfy a relationship of following Expression (4), $$2 \leq (d2-d1) \leq 10 \quad \text{Expression (4)}.$$

[13] The method of manufacturing an overlapped hot stamp molded body according to any one of [8] to [12], wherein the second steel sheet further includes a carbon-based coating having an emissivity of 0.7 or more on the surface of the aluminum-based plated layer on the side not in contact with the first steel sheet.

[14] The method of manufacturing an overlapped hot stamp molded body according to any one of [8] to [13], wherein a coating composed of at least one of ZnO and TiO₂ and having a coating weight per one face of 0.2 g/m² or more is further provided on the surface of the aluminum-based plated layer located on a surface of the second steel sheet.

[15] An overlapped hot stamp molded body includes: a first steel sheet having a sheet thickness of T1 (mm); and at least one second steel sheet connected to a surface of the first steel sheet via a welding point, smaller in area than the first steel sheet, and having a sheet thickness of T2 (mm), wherein: the first steel sheet is a plated steel sheet having an aluminum-based plated layer having an average plating thickness of K1 (μm) on both faces on both the faces of the first steel sheet; the second steel sheet is a plated steel sheet having an aluminum-based plated layer having a plating thickness of K2 (μm) on a surface on a side not in contact with the first steel sheet; and relationships of following Expression (11) and Expression (12) are satisfied $$10 \leq (K1-K2) \leq 33 \quad \text{Expression (11)}$$

$$(K1/K2)^2 \times (T1/T2) \geq 1.5 \quad \text{Expression (12)}.$$

Effect of the Invention

As explained above, according to the present invention, it is possible to solve the problem about the difference in temperature increasing rate between the overlapped part and the one-sheet part when using an aluminum-based plated steel sheet as a raw material so as to further improve the corrosion resistance of the plating after hot stamping.

EMBODIMENTS FOR CARRYING OUT THE INVENTION

Preferred embodiments of the present invention will be explained below in detail referring to the accompanying drawings. Note that, in the description and the drawings, the same codes are given to components having substantially the same functional configurations to omit duplicated explanation.

Figure 1:
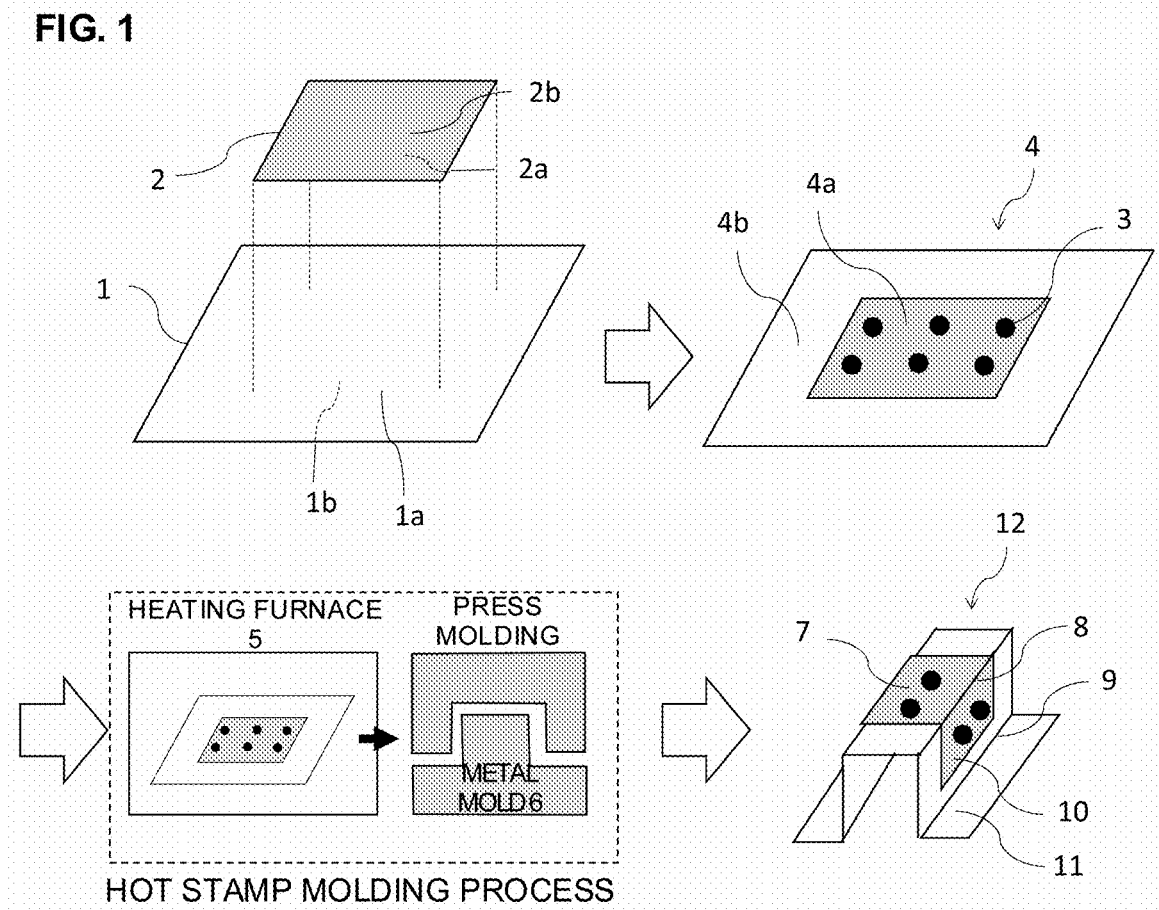
FIG. 1 is an explanatory view schematically illustrating examples of an overlapped blank for hot stamping, a method of manufacturing an overlapped hot stamp molded body, and an overlapped hot stamp molded body according to an embodiment of the present invention.

FIG. 1 is an explanatory view schematically illustrating examples of an overlapped blank for hot stamping, a method of manufacturing an overlapped hot stamp molded body, and an overlapped hot stamp molded body according to an embodiment of the present invention.

The overlapped blank for hot stamping according to this embodiment is used as a raw material of the overlapped hot stamp molded body.

As is schematically illustrated in FIG. 1, an overlapped blank for hot stamping 4 according to his embodiment is composed of a first steel sheet 1 and a second steel sheet 2 smaller in area than the first steel sheet by welding (3) them. In this event, a portion of the overlapped blank for hot stamping 4 where the second steel sheet 2 is overlapped is called an overlapped part 4a, and a not-overlapped portion is a one-sheet part 4b. Note that the second steel sheet 2 of the overlapped blank for hot stamping 4 according to this embodiment is preferably arranged within the first steel sheet 1 so that a portion protruding from the first steel sheet 1 does not exist as schematically illustrated in FIG. 1.

Further, on the surface of the first steel sheet 1, aluminum-based plating (not illustrated) is performed on both faces such as a face 1a on the side in contact with the second steel sheet 2 and a face 1b on the side not in contact with the second steel sheet 2, and also on the second steel sheet 2, aluminum-based plating (not illustrated) is performed on both faces such as a face 2a on the side in contact with the first steel sheet 1 and a face 2b on the side not in contact with the first steel sheet 1.

The overlapped blank for hot stamping 4 is heated up to an Ac3 point or higher in a heating furnace 5 as the method of manufacturing the overlapped hot stamp molded body according to this embodiment, whereby the steel sheet is made into austenite, and the overlapped blank for hot stamping 4 is press-molded and rapidly cooled by a metal mold 6 immediately after taken out of the furnace, whereby the steel sheet is transformed into martensite. Thus, the overlapped blank for hot stamping 4 becomes a hot stamp molded body 12 according to this embodiment excellent in collision resistant property. In this event, in at least a part of the overlapped part 4a, there is a portion which becomes a bent part 8 when the overlapped blank for hot stamping 4 becomes the hot stamp molded body 12.

In FIG. 1, a molded product using a hat-shaped metal mold is illustrated as an example of the overlapped hot stamp molded body 12, and names of sites of the hot stamp molded body 12 are a head top part 7, the bent part 8 of the head top part, a vertical wall part 10, a flange part 11, and a bent part 9 of the flange part.

Note that though the second steel sheet 2 according to this embodiment is arranged outside on the head top part 7 side in FIG. 1, the object of the present invention can be achieved even by arranging the second steel sheet 2 inside the head top part 7.

(1. Overlapped Blank for Hot Stamping)

Hereinafter, the overlapped blank for hot stamping 4 according to this embodiment will be explained in detail.

As explained above, the overlapped blank for hot stamping 4 according to this embodiment has the first steel sheet 1 and the second steel sheet 2 connected to the surface of the first steel sheet 1 via a welding point (namely, welded to the first steel sheet 1) and smaller in area than the first steel sheet 1, in which aluminum-based plating is performed on both faces of each of the first steel sheet 1 and the second steel sheet 2. In other words, the first steel sheet 1 and the second steel sheet 2 according to this embodiment are aluminum plated steel sheets each having an aluminum-based plated layer on both surfaces of the steel sheet being a base material.

<Base Material>

In the overlapped blank for hot stamping 4 according to this embodiment, the chemical components of the base material in each of the first steel sheet 1 and the second steel sheet 2 are not particularly limited. However, in order to obtain, for example, a tensile strength of 1500 MPa or more (about 400 HV or more in terms of Vickers hardness when a load is set to 9.81 N), it is preferable to use a base material having chemical components composed of, by mass %, C: 0.19% or more and 0.5% or less, Si: 0.01% or more and 1.5% or less, Mn: 0.4% or more and 2% or less, Cr: 0.01% or more and 1.0% or less, Ti: 0.001% or more and 0.1% or less, B: 0.0005% or more and 0.005% or less, Nb: 0.1% or less, Mo, Ni, Cu, Co, W, Sn, V, Sb: each 0.5% or less, Mg, Ca, Zr, REM: each 0.005% or less, the balance Fe and impurities. Further, the chemical components of the base material of the first steel sheet 1 and the chemical components of the base material of the second steel sheet 2 may be the same or different within the range of the above chemical components.

A method of manufacturing the aluminum-based plated steel sheet using the above chemical composition as the base material is not particularly limited but, for example, the one manufactured through a conventional pig iron-making process and steel-making process and by processes of hot rolling, pickling, cold rolling, Sendzimir hot-dip aluminum plating can be used.

In this embodiment, it is preferable that a ratio (t2/t1) between a sheet thickness t1 (mm) of the first steel sheet 1 and a sheet thickness t2 (mm) of the second steel sheet 2 is selectively 2.0 or less as expressed in the following Expression (3).

$$(t2/t1) \leq 2.0 \qquad \text{Expression (3)}$$

The reason why it is preferable to satisfy the above (3) will be explained below.

For the characteristics required for the aluminum-based plated steel sheet in this embodiment, it is important to further suppress the difference in temperature increasing rate between the overlapped part (low in temperature increasing rate) and the one-sheet part (high in temperature increasing rate), which is the problem when used as the overlapped blank, and therefore it is conceivable that it is important to suppress the sheet thickness t2 of the second steel sheet 2 to a certain degree with respect to the sheet thickness t1 of the first steel sheet 1. When the value of the ratio (t2/t1) is more than 2.0, the sheet thickness t2 of the second steel sheet 2 is too large, thus raising the possibility that the temperature increasing rate of the overlapped part becomes too high relative to that of the one-sheet part. The value of the ratio (t2/t1) is more preferably 0.9 or less. On the other hand, the lower limit value of the ratio (t2/t1) is not particularly defined but, when the value of the ratio (t2/t1) becomes less than 0.3, there is no problem in suppression of the difference in temperature increasing rate, but the value is possibly insufficient from the viewpoint of improving the collision resistant property for use as the automobile part by the overlapped part. Accordingly, the value of the ratio (t2/t1) is preferably 0.3 or more.

Note that the sheet thickness t1 of the first steel sheet 1 and the sheet thickness t2 of the second steel sheet 2 can be measured by using a micrometer. Further, the above sheet thickness t1, t2 is a sheet thickness including the thicknesses of the aluminum-based plated layers provided on both faces in addition to the sheet thickness of the base material.

<Aluminum-Based Plated Layer>

Regarding a coating weight W1 (g/m$^2$) of the aluminum-based plated layer formed on both faces of the first steel sheet 1 and a coating weight W2 (g/m$^2$) of the aluminum-based plated layer formed on both faces of the second steel sheet 2, W1, W2 are each 20 g/m$^2$ or more and 120 g/m$^2$ or less and satisfy the relationships of the following Expression (1) and Expression (2). Here, the coating weight W1 of the aluminum-based plated layer on the first steel sheet 1 represents an average coating weight on both faces of the first steel sheet 1. More specifically, when the coating weight of the aluminum-based plated layer on one face of the first steel sheet 1 is W1a, W1b (g/m$^2$), W1=0.5×(W1a+W1b). Further, the coating weight W2 of the aluminum-based plated layer on the second steel sheet 2 represents the coating weight of the aluminum-based plated layer on the surface on the side not in contact with the first steel sheet 1. The surface on the side not in contact with the first steel sheet 1 of the second steel sheet 2 is a face exposed to a heat source for heating when the manufactured overlapped blank is heated during the hot stamping.

$$30 \leq (W1-W2) \leq 100 \qquad \text{Expression (1)}$$

$$(W1/W2)^2 \times (t1/t2) \geq 1.5 \qquad \text{Expression (2)}$$

Examples of the characteristics required for the aluminum-based plated layer according to this embodiment include (a) suppression of the occurrence of Fe scale during hot-stamping heating and (b) suppression of chip and pressing flaw of the plating due to slipping (also called powdering) of the plating during the hot stamp molding. The powdering occurs due to a compressive stress applied on the plating on the face inside the bent part occurring during molding or due to a shear stress applied on the plating by the sliding from the metal mold during molding. When the coating weight W1, W2 of the aluminum-based plated layer on each steel sheet is less than 20 g/m$^2$, the thickness of the plating is small, thus causing a problem of insufficient suppression of the Fe scale. Therefore, the coating weight W1, W2 of the aluminum-based plated layer on each of the steel sheets is set to 20 g/m$^2$ or more independently. The coating weight W1, W2 of the aluminum-based plated layer on each of the steel sheets is preferably 30 g/m$^2$ or more and more preferably 35 g/m$^2$ or more independently. On the other hand, when the coating weight W1, W2 of plating per one face on each of the steel sheets is more than 120 g/m$^2$, a problem of insufficient suppression of the powdering occurs. Therefore, in this embodiment, the coating weight W1, W2 of plating per one face on each of the steel sheets is set to 120 g/m$^2$ or less independently. The coating weight W1, W2 of plating per one face on each of the steel sheets is preferably 115 g/m$^2$ or less and more preferably 100 g/m$^2$ or less independently.

Note that the thickness (μm) of the aluminum-based plated layer on each of the steel sheets can be approximated from the plating coating weight (g/m$^2$), and can be roughly found from the following Expression (5) though depending on the chemical composition of the Al-based plated layer.

$$(\text{plating thickness})=(\text{plating coating weight})/3 \qquad \text{Expression (5)}$$

Further, an example of the characteristic required for the aluminum-based plated layer according to this embodiment is (c) suppression of the difference in temperature increasing rate between the overlapped part (low in temperature increasing rate) and the one-sheet part (high in temperature increasing rate), which is the problem when used as the overlapped blank. As a measure for suppressing the difference in temperature increasing rate between the overlapped part and the one-sheet part, the coating weight W2 of the aluminum-based plated layer on the second steel sheet 2 is set to a coating weight smaller than the coating weight W1 of the aluminum-based plated layer on the first steel sheet 1, more specifically, the difference (W1−W2) in plating coating weight is set to 30 g/m$^2$ or more and 100 g/m$^2$ or less as expressed in the above Expression (1). Satisfying the relationship expressed in the above Expression (1) enables the alloying reaction of the plating for increasing the emissivity to speedily proceed up to the surface during the heating of the hot stamping. When the difference (W1−W2) in plating coating weight is less than 30 g/m$^2$, the improvement of the difference in temperature increasing rate as explained above cannot be obtained. The difference (W1−W2) in plating coating weight is preferably 35 g/m$^2$ or more and more preferably 40 g/m$^2$ or more. On the other hand, the upper limit value of the difference (W1−W2) in plating coating weight is not particularly limited from the viewpoint of suppression of the difference in temperature increasing rate as explained above, but the lower limit and the upper limit of the plating coating weight W1, W2 per one face on each of the steel sheets are preferably 20 g/m$^2$ and 120 g/m$^2$ respectively, and therefore the 100 g/m$^2$ is the upper limit in terms of calculation. Further, a difference (W1−W2) in plating coating weight of more than 100 g/m$^2$ is not preferable because the corrosion resistance of the plating decreases. The difference (W1−W2) in plating coating weight is preferably 90 g/m$^2$ or less and more preferably 80 g/m$^2$ or less. Note that considering the relationship expressed in the above Expression (1), the upper limit value of the coating weight W2 of the aluminum-based plated layer on the second steel sheet 2 is substantially 90 g/m$^2$.

Further, the aluminum-based plated layer according to this embodiment satisfies the relationships expressed in the above Expression (2) in addition to the above Expression (1). Satisfying the relationship expressed in the above Expression (2) enables the alloying reaction of the plating for increasing the emissivity to speedily proceed up to the surface during the heating of the hot stamping. In the above Expression (2), the power number of the sheet thickness ratio (t1/t2) is 1, whereas the power number of the plating coating weight ratio (W1/W2) is 2. From this, it is found that the plating coating weight ratio (W1/W2) is placed to be more important than the sheet thickness ratio (t1/t2) in the present invention, When the value of (W1/W2)$^2$×(t1/t2) is less than 1.5, the improvement in the difference in temperature increasing rate cannot be sufficiently obtained. The value of (W1/W2)$^2$×(t1/t2) is preferably 2 or more and more preferably 2.5 or more. On the other hand, the upper limit value of (W1/W2)$^2$×(t1/t2) is not particularly defined. However, an excessive increase in the value of (W1/W2)$^2$×(t1/t2), namely, an increase in (W1/W2) or (t1/t2) causes an increase in material cost accompanying the increase in W1 or t1, a decrease in corrosion resistance due to the decrease in W2, and a decrease in collision resistance property due to the decrease in t2. Therefore, the value of (W1/W2)$^2$×(t1/t2) is preferably 80 or less. The value of (W1/W2)$^2$×(t1/t2) is more preferably 60 or less.

Figure 2:
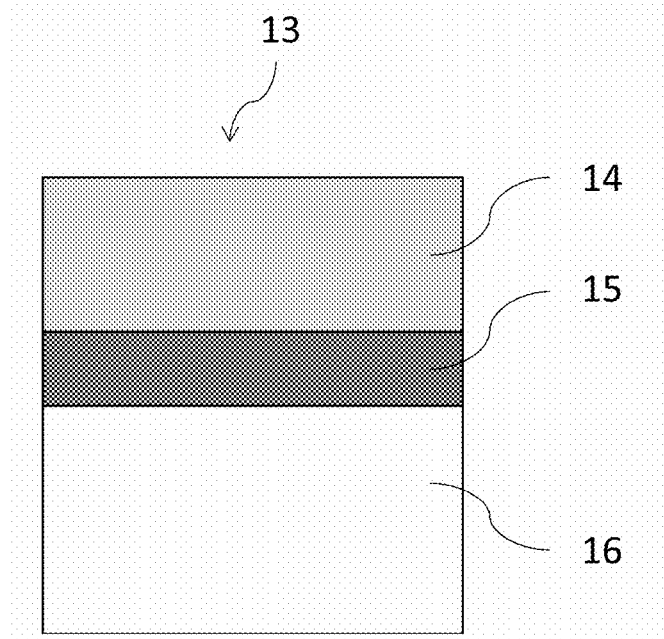
FIG. 2 is an explanatory view schematically illustrating a structure of an aluminum-based plated layer having an aluminum layer and an aluminum-iron-based alloy layer of the overlapped blank for hot stamping according to the embodiment.

FIG. 2 schematically illustrates the layer structure on one face side of a plated steel sheet 13 in which the aluminum-based plated layer according to this embodiment is provided. A more preferable layer structure of the aluminum-based plated layer according to this embodiment selectively realized will be explained below referring to FIG. 2.

Regarding the plating structure in the case of schematically illustrating the one face side of the plated steel sheet 13 subjected to treatment of the aluminum-based plated layer, the aluminum-based plated layer formed on the first steel sheet 1 and the second steel sheet 2 is preferably a two-layer structure of an aluminum layer 14 and an aluminum-iron-based alloy layer 15 in order from the surface toward a base material 16. Here, a thickness d1 (μm) of the aluminum-iron-based alloy layer 15 of the first steel sheet 1 is preferably 1 μm or more and more preferably 2 μm or more. Further, a thickness d2 (μm) of the aluminum-iron-based alloy layer 15 of the second steel sheet 2 is preferably 2 μm or more and more preferably 3 μm or more. On the other hand, the thickness d1 of the aluminum-iron-based alloy layer 15 of the first steel sheet 1 is preferably 9 μm or less and more preferably 8 μm or more. Further, the thickness d2 of the aluminum-iron-based alloy layer 15 of the second steel sheet 2 is preferably 10 μm or less and more preferably 9 μm or less.

Further, in addition to that the aluminum-based plated layers formed on the first steel sheet 1 and the second steel sheet 2 have the two-layer structure, it is preferable that a difference (d2−d1) between the thickness d1 (μm) of the aluminum-iron-based alloy layer 15 of the first steel sheet 1 and the thickness d2 (μm) of the aluminum-iron-based alloy layer 15 of the second steel sheet 2 is 2 μm or more and 10 μm or less as expressed in the following Expression (4).

$$2 \leq (d2-d1) \leq 10 \qquad \text{Expression (4)}$$

This because an example of the characteristic required for the aluminum-based plating according to this embodiment is suppression of the difference in temperature increasing rate between the overlapped part (low in temperature increasing rate) and the one-sheet part (high in temperature increasing rate), and in this event, it is preferable to make the thickness d2 of the aluminum-iron-based alloy layer 15 of the second steel sheet 2 large before heating of hot stamping in order to speedily promote the alloying reaction of the plating for increasing the emissivity during the heating of hot stamping at the overlapped part, whereas it is preferable to make the thickness d1 of the aluminum-iron-based alloy layer 15 of the first steel sheet 1 small in order to contrarily delay the alloying reaction at the one-sheet part. When the difference (d2−d1) in thickness between the aluminum-iron-based alloy layers 15 is less than 2 μm, the improvement in the difference in temperature increasing rate cannot be sufficiently obtained. The difference (d2−d1) in thickness between the aluminum-iron-based alloy layers 15 is more preferably 3 μm or more. On the other hand, the upper limit of the difference (d2−d1) in thickness between the aluminum-iron-based alloy layers 15 is not particularly limited in terms of the difference in temperature increasing rate, but when the value of the thickness d2 of aluminum-iron-based alloy layer 15 is more than 10 μm, the alloying proceeds too much to cause vigorous powdering at a molded portion during the hot stamping, and therefore 10 μm is the upper limit as explained above. The difference (d2−d1) in thickness between the aluminum-iron-based alloy layers 15 is more preferably 8 μm or less.

Note that according to the general hot-dip plating method as the method of treating the aluminum-based plated steel sheet, the steel sheet is dipped in a hot-dip aluminum plating bath and subjected to gas wiping in nitrogen or atmosphere, whereby the aluminum-based plated steel sheet adjusted in coating weight can be manufactured. As a result of this, the aluminum-iron-based alloy layer 15 is necessarily formed by elution of Fe during hot-dip plating at an interface between the plated layer and the base material steel sheet (base material 16 in this embodiment). The thickness of the aluminum-iron-based alloy layer 15 to be formed can be increased by extending the time of dipping in the hot-dip plating.

The chemical composition of the hot-dip aluminum plating bath for forming the aluminum-based plated layer is not particularly limited. However, the content of Al in the hot-dip aluminum plating bath for forming it is preferably 80 mass % or more in terms of being excellent in heat resistance, and the content of Si in the hot-dip aluminum plating bath is preferably 2 mass % or more in terms of easy control of the thickness of the aluminum-iron-based alloy layer 15. When the content of Si is less than 2 mass %, the aluminum-iron-based alloy layer 15 becomes too thick, resulting in decreased moldability. On the other hand, when the content of Si in the hot-dip aluminum plating bath is more than 15 mass %, the alloying during the hot stamping heating becomes slow, resulting in decreased productivity of the hot stamping. Therefore, the content of Si in the hot-dip aluminum plating bath is preferably 15 mass % or less.

When Si is contained by 2 mass % or more and 15 mass % or less, a eutectic structure of Al and Si is formed in the aluminum layer 14 based on a constitution diagram. In the case of the hot-dip plating method, Fe is inevitably contained by 1 mass % or more in some cases as an eluted component from the steel sheet. Examples of other inevitable impurity include eluted components in a hot-dip plating facility and elements such as Cr, Mn, V, Ti, Sn, Ni, Cu, W, Bi, Mg, Ca and so on caused from the impurity in an ingot of the hot-dip aluminum plating bath, and those elements are contained by less than 1 mass % in some cases.

Examples of the chemical composition of the aluminum-iron-based alloy layer 15 include a θ-phase ($FeAl_3$), a η-phase ($Fe_2Al_5$), a ζ-phase ($FeAl_2$), $Fe_3Al$, a Fe-based BCC-phase (α2, α) and so on, and the aluminum-iron-based alloy layer 15 is composed by a combination of those plating phases. Examples of the chemical composition of the aluminum-iron-based alloy layer 15 in the case of containing Si include τ1-$Al_2Fe_3Si_3$, τ2-$Al_3FeSi$, τ3-$Al_2FeSi$, τ4-$Al_3FeSi2$, τ5-$Al_8Fe_2Si$, τ6-$Al_9Fe_2Si_2$, τ7-$Al_3Fe_2Si_3$, τ8-$Al_2Fe_3Si_4$, τ10-$Al_4Fe_{1.7}Si$, τ11-$Al_5Fe_2Si$ and so on, and the chemical composition of the aluminum-iron-based alloy layer 15 is mainly composed of τ5.

Further, an example of the method of specifying the coating weight of the aluminum-based plated layer is a sodium hydroxide-hexamethylenetetramine and hydrochloric acid peeling gravimetric method. Specifically, a test piece of a predetermined area S ($m^2$) (for example, 50×50 mm) is prepared in conformity to the description of JIS G 3314: 2011, and a weight w1 (g) is measured in advance. Thereafter, the test piece is dipped in sequence in a sodium hydroxide solution and a hydrochloric acid solution in which hexamethylenetetramine is added, dipped until foaming due to melting of the plating ends, and immediately washed in water, and then a weight w2 (g) is measured again. In this event, a coating weight Wp ($g/m^2$) of the aluminum-based plated layer can be obtained by the following Expression (6).

$$Wp=(w1-w2)/S \qquad \text{Expression (6)}$$

Note that when the size of the test piece is small, the coating weight of the aluminum-based plated layer can be obtained by performing observation of the section of the plating under an optical microscope (area: 100 μm×100 μm) and measurement of the plating thickness similarly in three fields of view, and performing conversion from an average value of the thicknesses measured in the three fields of view into the coating weight using Expression (5). The plating thickness to be measured at this time means a total thickness of the thickness of the aluminum layer 14 and the thickness of the aluminum-iron-based alloy layer 15 illustrated in FIG. 2.

The thickness of the aluminum-iron-based alloy layer 15 can be obtained as an average value of the thicknesses measured in three fields of view by performing similar observation of the section of the plating under an optical microscope (area: 100 μm×100 μm) without etching and measurement of the thickness of the aluminum-iron-based alloy layer 15 in the three fields of view.

<Coating Layer>

Figure 3:
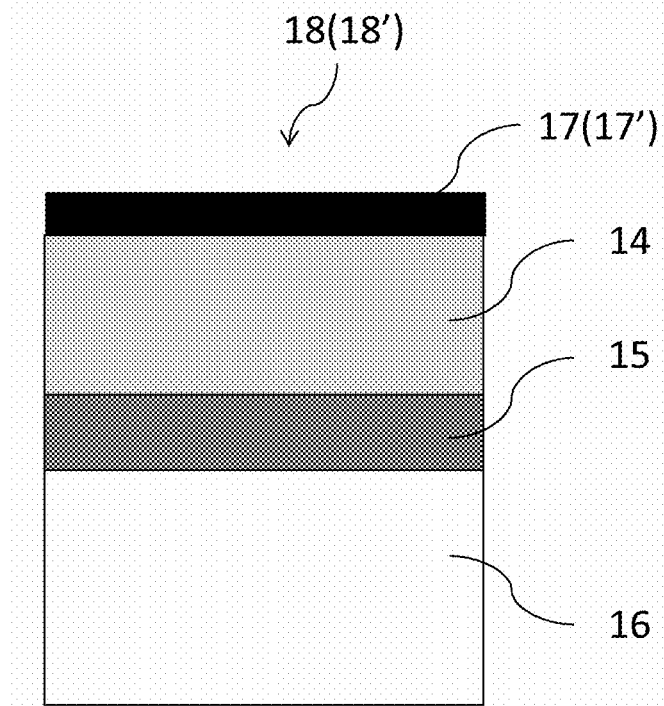
FIG. 3 is an explanatory view schematically illustrating a structure of an aluminum-based plated layer having an aluminum layer and an aluminum-iron-based alloy layer and a structure having a carbon-based coating or a coating containing ZnO, $TiO_2$ on its surface of the overlapped blank for hot stamping according to the embodiment.

FIG. 3 schematically illustrates a layer structure on one face side of a plated steel sheet 18 provided with the aluminum-based plated layer according to this embodiment and a carbon-based coating on its surface, or a layer structure on one face side of a plated steel sheet 18' provided with the aluminum-based plated layer according to this embodiment and a coating containing ZnO, $TiO_2$ on its surface. A more preferable layer structure of the aluminum-based plated layer according to this embodiment and the carbon-based coating or the coating containing ZnO, $TiO_2$ on its surface selectively realized will be explained below referring to FIG. 3.

[Coating Layer (Carbon-Based)]

It is preferable that the second steel sheet 2 is further provided with a carbon-based coating layer 17 having an emissivity of 0.7 or more on the surface of the aluminum-based plated layer located on a surface on the side not in contact with the first steel sheet 1. The aluminum-based plated layer at this time has the carbon-based coating layer 17, the aluminum layer 14, and the aluminum-iron-based alloy layer 15, on the base material 16, in order from the surface toward the base material 16 as explained above. To suppress the difference in temperature increasing rate between the overlapped part (low in temperature increasing rate) and the one-sheet part (high in temperature increasing rate) which is the problem when used as the overlapped blank, it is preferable to set the emissivity of the carbon-based coating layer 17 to 0.7 or more. When the emissivity is less than 0.7, the effect of improvement is insufficient. The upper limit of the emissivity is set to 1 in terms of principle. Examples of the component high in emissivity include a metal oxide, a metal nitride and so on and, for example, a carbon-based coating containing carbon black is preferable. This is because use of the carbon-based coating containing carbon as a main component causes the coating to be burned during the heating of hot stamping and exhausted as $CO_2$ and to become difficult to remain after the hot stamping, thereby preventing a decrease in corrosion resistance of a molded product after the hot stamping.

As for the method of specifying the emissivity, for example, in the case where an infrared thermography (manufactured by Nippon Avionics Co., Ltd., G100EX) is used to measure a radiation temperature of a sample and, at the same time, a K-type thermocouple is used to measure the temperature of the sample, the emissivity at a temperature where the radiation temperature most closely matches the temperature measured by the thermocouple can be obtained and thereby specified. Further, an example of the method of specifying the carbon-based coating layer 17 is a method of specifying the existence of the carbon-based coating layer 17 when a carbon element (C) at an element concentration of 20 mass % or more is detected as a result of performing a depth direction analysis of the coating using a radio frequency glow discharge optical emission spectrometry (GDS, manufactured by HORIBA, Ltd.). The thickness of the carbon-based coating layer 17 is not particularly limited when the emissivity is 0.7 or more, and is preferably 0.2 µm or more and more preferably 0.5 µm or more because of ease of the industrial treatment of the coating treatment. On the other hand, when the thickness of the carbon-based coating layer 17 is made excessively large, the effect of improving the emissivity is uneconomically saturated and the adhesiveness with the steel sheet of the coating decreases, so that the thickness is preferably 5 µm or less and more preferably 3 µm or less. Note that the thickness of the carbon-based coating layer 17 can be measured by the above depth direction analysis by the GDS.

[Coating Layer (ZnO, TiO$_2$)]

Further, it is preferable to provide a coating layer 17' composed of at least one of ZnO and TiO$_2$ and having a coating weight per one face of 0.2 g/m$^2$ or more, on the surface of the aluminum-based plated layer formed on the surface of the second steel sheet 2. The coating weight mentioned here means the amount of deposition per unit area as a metal Zn or a metal Ti. ZnO and TiO$_2$ are oxides excellent in infrared absorption in addition to improving the emissivity. Therefore, the provision of the coating layer 17' enables suppression of the difference in temperature increasing rate between the overlapped part (low in temperature increasing rate) and the one-sheet part (high in temperature increasing rate) which is the problem when used as the overlapped blank. In particular, ZnO and TiO$_2$ being oxides remain even during the heating as compared with the above-explained carbon-based coating layer 17 burned during the hot stamping heating. Therefore, the coating layer 17' can further contribute to the improvement in emissivity at high temperature. When the coating weight of the coating layer 17' is less than 0.2 g/m$^2$, sufficient effect of suppressing the difference in temperature increasing rate cannot be expected in some cases. The coating weight of the coating layer 17' is more preferably 0.3 g/m$^2$ or more. On the other hand, though the upper limit of the coating weight of the coating layer 17' is not particularly defined, when the coating weight is too much, the effect is saturated and the coating cost increases and is thus not practical, and ZnO and TiO$_2$ remain even after the hot stamping heating and therefore the corrosion resistance decreases in some cases. Therefore, the coating weight of the coating layer 17' is more preferably 3 g/m$^2$ or less. As the method of specifying the coating weight of ZnO and TiO$_2$, they can be obtained by analyzing the elements from the surface using a fluorescent X-ray analysis apparatus (manufactured by RIGAKU, ZSX Primus) and quantifying the metal Zn and the metal Ti.

Though the method of treating the above-explained carbon-based coating layer 17 or coating layer 17' having ZnO or TiO$_2$ is not particularly limited, they can be manufactured, for example, by preparing an aqueous coating solution in which an aqueous dispersion type carbon black (for example, RCF #52 manufactured by Mitsubishi Chemical Corporation), ZnO (for example, manufactured by C. I. Kasei Co., Ltd., Nano Tek) or TiO$_2$ (for example, manufactured by C. I. Kasei Co., Ltd., Nano Tek) is dispersed in water, applying it with a roll coater after performing the hot-dip aluminum plating treatment, and performing a dry baking treatment.

Note that the aluminum-based plated layer according to this embodiment may include both of the carbon-based coating layer 17 and the coating layer 17' having ZnO or TiO$_2$. In this case, the arrangement order of the carbon-based coating layer 17 and the coating layer 17' having ZnO or TiO$_2$ is not particularly limited, but the carbon-based coating layer 17 may be located at the upper layer of the coating layer 17' having ZnO or TiO$_2$, or the coating layer 17' having ZnO or TiO$_2$ may be located at the upper layer of the carbon-based coating layer 17.

Further, the carbon-based coating layer 17 or the coating layer 17' containing ZnO, TiO$_2$ may be provided on both faces of the steel sheet being the base material, and is more preferably provided only on a face on the side exposed to the heat source during the heating of hot stamping in the steel sheet being the base material.

<Welding>

In the overlapped blank for hot stamping in which the first steel sheet 1 and the second steel sheet 2 are overlapped and welded, the welding is preferably spot welding and the spot density of the spot welding is preferably 1 spot/200 cm$^2$ or more. The reason will be explained below.

At the overlapped part, the first steel sheet 1 and the second steel sheet 2 are brought into good contact to improve heat transfer, thereby enabling suppression of the difference in temperature increasing rate between the overlapped part (low in temperature increasing rate) and the one-sheet part (high in temperature increasing rate) which is the problem when used as the overlapped blank.

As the kind of the welding, spot welding, seam welding, braze welding, laser welding, plasma welding, arc welding or the like can be selected, and the spot welding which can establish good contact even at the inside of the overlapped part at a plurality of points and establish a direct bond by applying a pressure between the steel sheets is preferable in terms of bringing the overlapped part into good contact.

The spot density of the spot welding is preferably 1 spot/200 cm$^2$ or more as explained above. When the spot density is less than 1 spot/200 cm$^2$, the contact between the steel sheets is insufficient, resulting in insufficient improvement in temperature increase at the overlapped part. The spot density of the spot welding is more preferably 1 spot/40 cm$^2$ or more. On the other hand, the upper limit of the spot density of the spot welding is not particularly defined, but is preferably 1 spot/1 cm$^2$ or less because when the density is too high, a shunt current occurs in a welding current to make the welding difficult.

The spot density (spot/cm$^2$) of the spot welding is obtained by dividing the number of spots of the spot welding in the second steel sheet 2 treated into the blank by the area of the second steel sheet 2.

Figure 4:
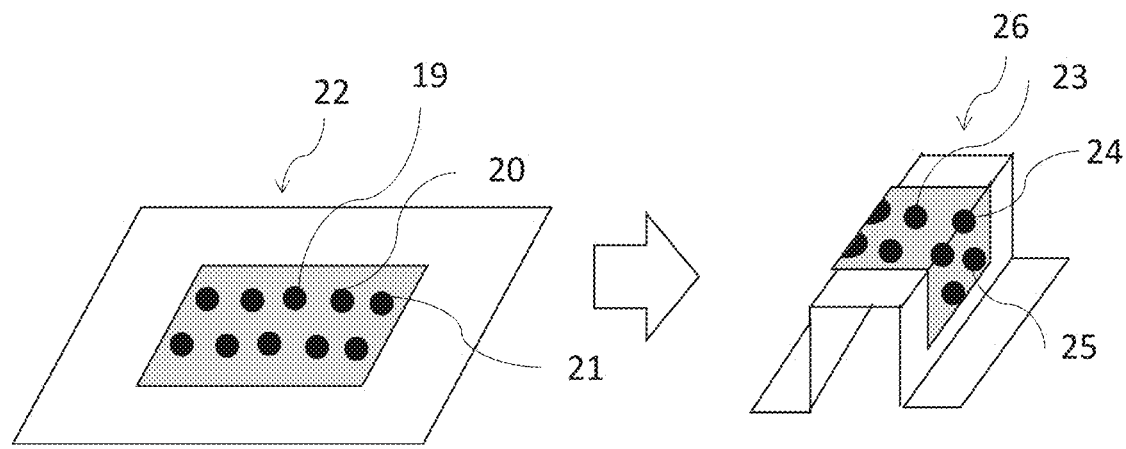
FIG. 4 is an explanatory view schematically illustrating examples of an overlapped blank for hot stamping, a method of manufacturing an overlapped hot stamp molded product, and an overlapped hot stamp molded product according to the embodiment in which the spot density of spot welding is increased to provide spots of the spot welding at a portion which becomes a bent portion.

Further, at least one spot of the spot welding preferably exists at a portion which becomes the bent part after the hot stamp molding. To suppress the difference in temperature increasing rate between the overlapped part (low in temperature increasing rate) and the one-sheet part (high in temperature increasing rate) which is the problem when used as the overlapped blank, it is important to bring the first steel sheet 1 and the second steel sheet 2 at the overlapped part into good contact. Here, as illustrated in FIG. 4, a hot stamp overlapped molded body 26 is manufactured by hot stamping an overlapped blank for hot stamping 22. In this event, a stress is likely to be applied to the bent part relatively more than to the head top part or the vertical wall part during the hot stamp molding, so that voids are likely to occur, sufficient cooling rate cannot be obtained during cooling the metal mold, the hardness decreases, and the collision resistant property decreases. Therefore, by arranging the spots (welded parts 24) of the spot welding at the bent part of the hot stamp molded body 26, voids at the bent part can be suppressed. Accordingly, it is preferable to form the spots (welded parts 20) of the spot welding at a portion which becomes the bent part after the hot stamp molding as illustrated in FIG. 4 in the overlapped blank for hot stamping 22. Note that in this embodiment, spots (welded parts 19) of the spot welding may be formed at a portion which becomes the head top part and spots (welded parts 21) of the spot welding may be formed at a portion which becomes the vertical wall part after the hot stamp molding. As a result of this, spots (welded parts 23) of the spot welding are arranged at the head top part of the hot stamp molded body 26 and spots (welded parts 25) of the spot welding are arranged at the vertical wall part of the hot stamp molded body 26 after the spot welding.

(2. Overlapped Hot Stamp Molded Body and its Manufacturing Method)

In the method of manufacturing the hot stamp molded body according to this embodiment, as illustrated in FIG. 1, the above-explained overlapped blank for hot stamping 4 is heated, and at the time when molding it immediately after the heating, the bent part subjected to bending is provided at least at a part of the overlapped part, thereby manufacturing the overlapped hot stamp molded body 12 in this embodiment.

The temperature of the heating is not particularly limited but is generally set to a temperature range of the Ac3 point (for example, 800° C.) or higher and 1000° C. or lower, and cooling is performed using a coolant such as the metal mold or water during molding immediately after the heating, whereby the overlapped hot stamp molded body 12 excellent in collision resistant property can be obtained. Note that the temperature of the heating means the maximum ultimate temperature of the steel sheet at the overlapped part, and examples of the heating method include heating by an electric furnace, a gas furnace, a far-infrared furnace, a near-infrared furnace and the like, energization heating, high-frequency heating, and induction heating.

The overlapped hot stamp molded body 12 according to this embodiment manufactured as explained above includes a first steel sheet 1 having a sheet thickness of T1 (mm) and at least one second steel sheet 2 overlapped and welded on the first steel sheet, smaller in area than the first steel sheet, and having a sheet thickness of T2 (mm) Here, the first steel sheet in the overlapped hot stamp molded body 12 is a plated steel sheet having an aluminum-based plated layer having an average plating thickness K1 (μm) on both faces provided on both faces of the first steel sheet. Further, the second steel sheet 2 in the overlapped hot stamp molded body 12 is a plated steel sheet having an aluminum-based plated layer having a plating thickness K2 (μm) on a surface on the side not in contact with the first steel sheet. Note that the plating thickness of the aluminum-based plated layer on the surface on the side in contact with the first steel sheet in the second steel sheet is not particularly defined.

Here, the average plating thickness K1 of the aluminum-based plated layer in the first steel sheet is preferably 20 μm or more and more preferably 25 μm or more. Further, the plating thickness K2 on the side not in contact with the first steel sheet of the aluminum-based plated layer in the second steel sheet is preferably 10 μm or more and more preferably 15 μm or more. On the other hand, the average plating thickness K1 of the aluminum-based plated layer in the first steel sheet is preferably 55 μm or less and more preferably 50 μm or less. Further, the plating thickness K2 on the side not in contact with the first steel sheet of the aluminum-based plated layer in the second steel sheet is preferably 45 μm or less and more preferably 40 μm or less. The average plating thicknesses K1 and the plating thickness K2 falling within the above ranges respectively make it possible to keep the corrosion resistance of the overlapped hot stamp molded body 12 in an excellent state.

Further, the overlapped hot stamp molded body 12 according to this embodiment satisfies the relationships in the following Expression (11) and Expression (12).

$$10 \leq (K1-K2) \leq 33 \quad \text{Expression (11)}$$

$$(K1/K2)^2 \times (T1/T2) \geq 1.5 \quad \text{Expression (12).}$$

When a difference (K1−K2) in plating thickness is less than 10 in the overlapped hot stamp molded body 12 according to this embodiment, it is difficult to keep the corrosion resistance of the overlapped hot stamp molded body 12 in an excellent state. The difference (K1−K2) in plating thickness is preferably 12 μm or more and more preferably 14 μm or more. On the other hand, a difference (K1−K2) in plating thickness of more than 33 is not preferable because the corrosion resistance of the plating decreases. The difference (K1−K2) in plating thickness is preferably 30 μm or less and more preferably 27 μm or less.

Further, the overlapped hot stamp molded body 12 according to this embodiment satisfies the relationship of the above Expression (11) as well as that of the above Expression (12). By satisfying the relationship expressed in the above Expression (12), the alloying reaction of the plating for improving the emissivity during the heating of hot stamping speedily proceeds up to the surface, resulting in that the overlapped hot stamp molded body 12 becomes to exhibit excellent corrosion resistance.

The value of $(K1/K2)^2 \times (T1/T2)$ is less than 1.5, the improvement in the difference in temperature increasing rate cannot be sufficiently obtained, resulting in difficulty in keeping the excellent corrosion resistance. The value of $(K1/K2)^2 \times (T1/T2)$ is preferably 2 or more and more preferably 2.5 or more. On the other hand, the upper limit value of $(K1/K2)^2 \times (T1/T2)$ is not particularly defined. However, an excessive increase in value of $(K1/K2)^2 \times (T1/T2)$, namely, an increase in (K1/K2) or (T1/T2) causes an increase in material cost accompanying the increase in K1 and T1, a decrease in corrosion resistance due to the decrease in K2, and a decrease in collision resistant property due to the decrease in T2. Therefore, the value of $(K1/K2)^2 \times (T1/T2)$ is preferably 80 or less, and the value of $(K1/K2)^2 \times (T1/T2)$ is more preferably 60 or less.

The above plating thickness K1, K2 can be obtained as an average value of the plating thicknesses measured in three fields of view by performing observation of the section of the plating under an optical microscope (area: 100 μm×100 μm) after nital etching and measurement of the plating thickness in the three fields of view. Note that though there are plating thicknesses of the first steel sheet at a position of the one-sheet part and at a position of a two-sheet part in contact with the second steel sheet, the plating thickness of the first steel sheet is measured from the one-sheet part from the point that the temperature increasing rate is high, the heating time in the hot stamping is longest, and the corrosion resistance is likely to deteriorate.

The overlapped hot stamp molded body 12 in this embodiment, when used as an automotive part, is generally used after being subjected to welding, phosphoric acid-based conversion treatment, electrodeposition coating and so on. Accordingly, for example, a zinc phosphate coating and a phosphoric acid coating by the phosphoric acid-based conversion treatment and an organic coating of 5 μm or more and 50 μm or less by the electrodeposition coating on the surface thereof and so on are formed on the surface of the hot stamp molded body 12 in some cases. For improving the external quality and corrosion resistance, intermediate coating, finish coating and so on are further performed after the electrodeposition coating in some cases.

EXAMPLES

Hereinafter, the present invention will be further concretely explained using examples.

Example 1

Figure 5:
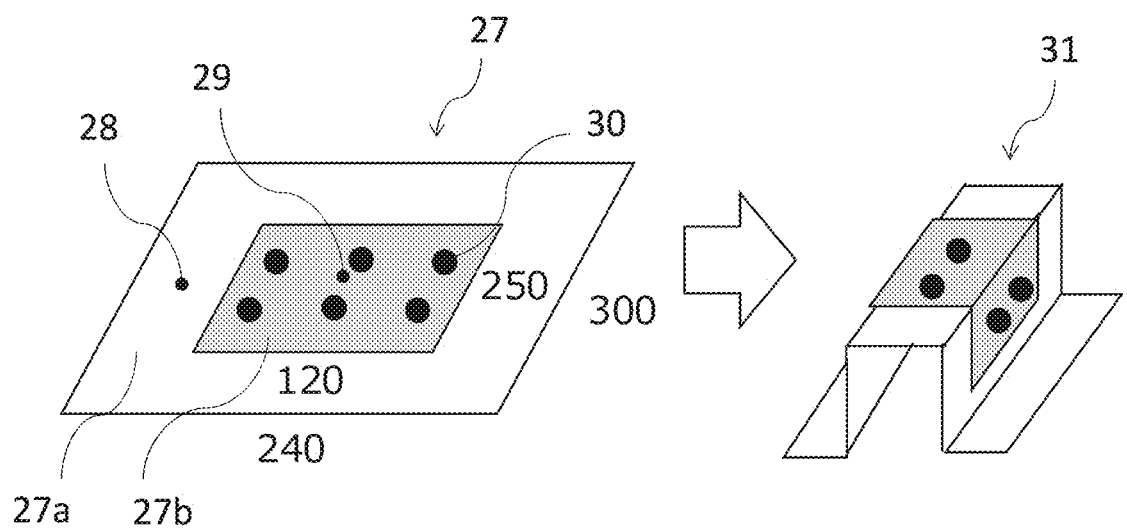
FIG. 5 is an explanatory view schematically illustrating positions where thermocouples are attached as a method of measuring temperature increasing rates of an overlapped part and a one-sheet part in examples.
Figure 6:
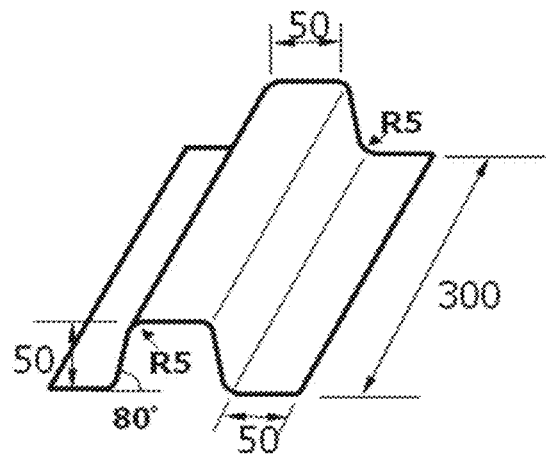
FIG. 6 is an explanatory view schematically illustrating a shape of a molded product by a metal mold used for evaluating the corrosion resistance of a molded product in examples.

As listed in Table 1, a cold-rolled steel sheet through ordinary hot-rolling process and cold-rolling process and having a steel component containing chemical components (by mass %, C: 0.21%, Si: 0.2%, Mn: 1.1%, P: 0.01%, S: 0.008%, Cr: 0.3%, Ti: 0.02%, B: 0.002%, the balance: Fe and impurities) was used as a sample material and the aluminum plating treatment was performed on its both faces on a Sendzimir hot-dip aluminum plating treatment line. After the plating, the plating coating weight was adjusted by the gas wiping method, and then cooling was performed. The plating bath composition in this event was 89% Al-9% Si-2% Fe. Manufacture was performed with a sheet thickness of 2 mm and a plating coating weight as listed in Table 1, and a first steel sheet 27a of 300×240 mm and a second steel sheet 27b of 250×120 mm were prepared as illustrated in FIG. 5 by cutting and subjected to spot welding as illustrated at spots (welded parts 30) in FIG. 5 to produce an overlapped blank for hot stamping 27. This blank was subjected to hot stamping heating at 910° C. to investigate the temperature increasing rate, and immediately subjected to mold cooling, thereby obtaining an overlapped hot stamp molded body 31. Levels are listed in Table 1 with examples of the present invention (hereinafter, simply described as "invention examples") indicated as A1 to A12 and comparative examples indicated as A13 to A17. The metal mold is a metal mold with which a hat molded part having a shape and sizes illustrated in FIG. 6 can be obtained. Note that in Table 1 illustrated below, the average coating weight on both faces is indicated as the plating coating weight W1 of the first steel sheet, and the coating weight on the face (one face) exposed to the heat source during the hot stamping heating is indicated as the plating coating weight W2 of the second steel sheet.

The sheet thickness of the steel sheet and the coating weight of the plating were measured by a micro-gauge by the methods as described in JIS G 3314: 2011 respectively.

To investigate the difference in temperature increasing rate between the overlapped part and the one-sheet part of the blank, K-type thermocouples were welded to a center 29 of the overlapped part and a one-sheet part 28 of the overlapped blank for hot stamping 27 illustrated in FIG. 5, whereby the temperature increasing times were obtained and evaluated. The temperature increasing times were obtained from times when 900° C. was reached, and the evaluation was performed based on the difference between the temperature increasing times of the overlapped part and the one-sheet part. The evaluation criteria are as follows. Evaluations A to E were determined to be good, and Evaluation F was determined to be bad.

A: 130 seconds or less
B: more than 130 seconds and 140 seconds or less
C: more than 140 seconds and 150 seconds or less
D: more than 150 seconds and 160 seconds or less
E: more than 160 seconds and 170 seconds or less
F: more than 170 seconds The results of the investigation about the difference in temperature increasing rate between the overlapped part and the one-sheet part of the blank were summarized in Table 1.

In A1 to A12 which are the invention examples, both of the coating weight W1 of the first steel sheet and the coating weight W2 of the second steel sheet were 20 $g/m^2$ or more and 120 $g/m^2$ or less, the difference (W1−W2) in plating coating weight satisfied 30 $g/m^2$ or more and 100 $g/m^2$ or less, and the difference in temperature increasing rate between the overlapped part and the one-sheet part was good. However, A13 to A17 were bad.

Further, the evaluations of A1 to A6, A8, A9, A11 of the invention examples were D, in which the differences between the coating weight W1 of the first steel sheet and the coating weight W2 of the second steel sheet were 35 $g/m^2$ or more in the above-explained referable range, so that the differences in temperature increasing rate between the overlapped part and the one-sheet part were considered to be excellent as compared with Evaluation E of A7, A10, A12.

TABLE 1

|  | LEVEL | FIRST STEEL SHEET PLATING COATING WEIGHT W1 [$g/m^2$] | SECOND STEEL SHEET PLATING COATING WEIGHT W2 [$g/m^2$] | DIFFERENCE (W1 − W2) IN COATING WEIGHT BETWEEN STEEL SHEETS [$g/m^2$] | $(W1/W2)^2 \times (t1/t2)$ | DIFFERENCE IN TEMPERATURE INCREASING RATE BETWEEN SUPERIMPOSED PART AND ONE-SHEET PART |
|---|---|---|---|---|---|---|
| INVENTION EXAMPLE | A1 | 115 | 30 | 85 | 14.7 | D |
|  | A2 | 115 | 45 | 70 | 6.5 | D |
|  | A3 | 115 | 65 | 50 | 3.1 | D |
|  | A4 | 115 | 85 | 30 | 1.8 | E |
|  | A5 | 90 | 20 | 70 | 20.3 | D |
|  | A6 | 90 | 40 | 50 | 5.1 | D |
|  | A7 | 90 | 60 | 30 | 2.3 | E |
|  | A8 | 80 | 30 | 50 | 7.1 | D |
|  | A9 | 80 | 40 | 40 | 4.0 | D |
|  | A10 | 80 | 50 | 30 | 2.6 | E |
|  | A11 | 70 | 30 | 40 | 5.4 | D |
|  | A12 | 60 | 30 | 30 | 4.0 | E |
| COMPARATIVE EXAMPLE | A13 | 80 | 80 | 0 | 1.0 | F |
|  | A14 | 80 | 70 | 10 | 1.3 | F |
|  | A15 | 40 | 40 | 0 | 1.0 | F |
|  | A16 | 10 | 10 | 0 | 1.0 | F |
|  | A17 | 150 | 150 | 0 | 1.0 | F |

Note that separately from the above A1 to A17, the one having a difference (W1−W2) in plating coating weight of more than 100 g/m² was produced, in which a sufficient result in separately carried out corrosion resistance evaluation cannot be obtained.

Example 2

Figure 7:
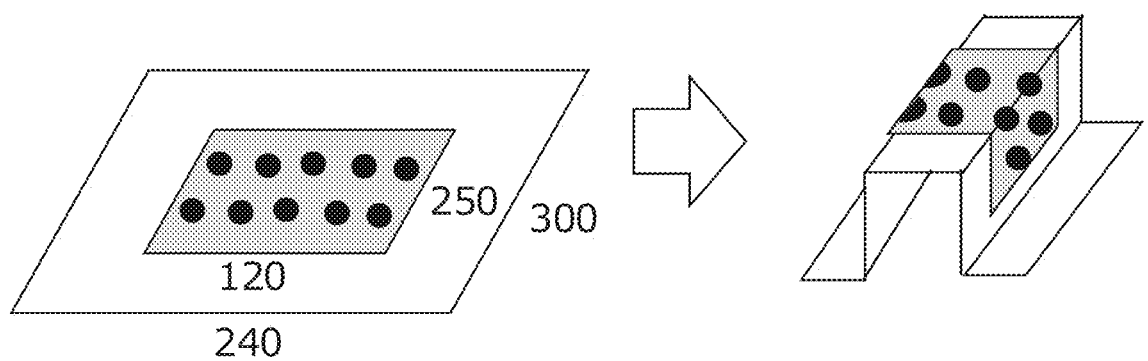
FIG. 7 is an explanatory view schematically illustrating examples of an overlapped blank for hot stamping, a method of manufacturing an overlapped hot stamp molded product, and an overlapped molded product according to an example of the present invention in which the spot density of the spot welding in the example is increased as compared with that in FIG. 5 and spots of the spot welding are provided at a portion which becomes a bent part after molding.
Figure 8:
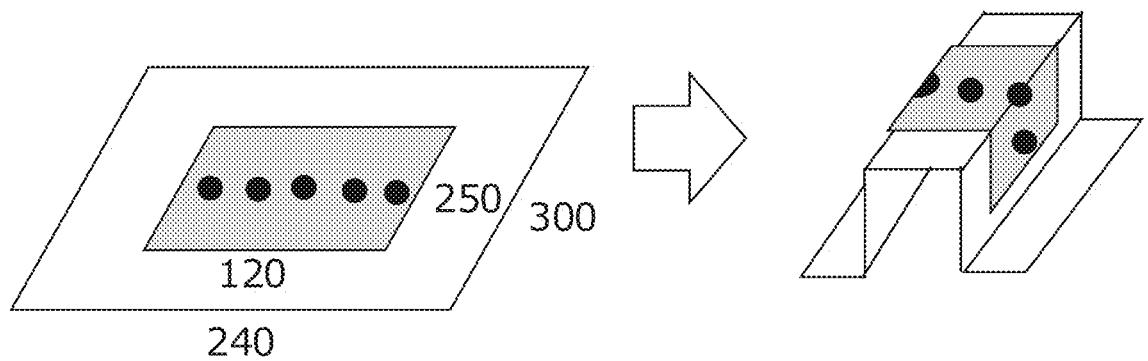
FIG. 8 is an explanatory view schematically illustrating examples of an overlapped blank for hot stamping, a method of manufacturing an overlapped hot stamp molded product, and an overlapped molded product according to an example of the present invention in which the spot density of the spot welding in the example is decreased as compared with that in FIG. 7 and spots of the spot welding are provided at a portion which becomes a bent part after molding.

The influence of the spot welding was investigated under the same manufacturing condition as that of the level A9 in Example 1. The spot density of the spot welding can be obtained from (number of spots of spot welding/area of second steel sheet). The spot density of A9 is 6 spots/300 cm² (=1 spot/50 cm²) and there is no spot of the spot welding at a portion which becomes the bent part after the hot stamp molding in the overlapped part as illustrated in FIG. 5. The level of the hot stamp molded body using the overlapped blank in which the same first steel sheet and second steel sheet as those of the level A9 are used and the sport welding is performed at one spot at the center of the overlapped part is regarded as A18. In this level A18, the spot density is 1 spot/300 cm², and there is no spot of the spot welding at a portion which becomes the bent part after the hot stamp molding similarly in the overlapped part. In addition, the level of the hot stamp molded body using the overlapped blank in which the same first steel sheet and second steel sheet as those of A9 are used and the sport welding is performed as illustrated in FIG. 7 is regarded as A19. In this level A19, the spot density is 10 spots/300 cm² (=1 spot/30 cm²), and there are spots of the spot welding at a portion which becomes the bent part after the hot stamp molding in the overlapped part. Similarly, the level of the hot stamp molded body using the overlapped blank in which the same first steel sheet and second steel sheet as those of A9 are used and the sport welding is performed as illustrated in FIG. 8 is regarded as A20. In this level A20, the spot density is 5 spots/300 cm² (=1 spot/60 cm²), and there are spots of the spot welding at a portion which becomes the bent part after the hot stamp molding in the overlapped part.

The differences in temperature increasing rate between the overlapped part and the one-sheet part in A9, A18 to A20 were evaluated as in Example 1. As a result, A9 was D as explained above, A18 was E, A19 was C, and A20 was C. A18 in which the spot density of the spot welding was less than 1 spot/200 cm² was slightly inferior in the spot density of the spot welding to A9 in which the spot density of the spot welding was 1 spot/200 cm² or more, showing that A19, A20 in which the spots of the spot welding exist at a portion which becomes the bent part after the hot stamp molding are superior to A9.

TABLE 2

| | LEVEL | FIRST STEEL SHEET PLATING COATING WEIGHT W1 [g/m²] | SECOND STEEL SHEET PLATING COATING WEIGHT W2 [g/m²] | DIFFERENCE (W1 − W2) IN COATING WEIGHT BETWEEN STEEL SHEETS [g/m²] | (W1/W2)² × (t1/t2) | SPOT DENSITY OF SPOT WELDING | DIFFERENCE IN TEMPERATURE INCREASING RATE BETWEEN SUPERIMPOSED PART AND ONE-SHEET PART |
|---|---|---|---|---|---|---|---|
| INVENTION EXAMPLE | A9 (REPEAT) | 80 | 40 | 40 | 4.0 | 6 SPOTS/300 cm² | D |
| | A18 | 80 | 40 | 40 | 4.0 | 1 SPOT/300 cm² | E |
| | A19 | 80 | 40 | 40 | 4.0 | 10 SPOTS/300 cm² | C |
| | A20 | 80 | 40 | 40 | 4.0 | 5 SPOTS/300 cm² | C |

Example 3

As listed in Table 3, the overlapped blank for hot stamping 27 was produced as in Example 1. In this event, a blank in which the sheet thicknesses of the first steel sheet and the second steel sheet were changed as listed in Table 3 was produced and this blank was subjected to hot stamping heating at 910° C. to investigate the temperature increasing rate. In this event, the difference in temperature increasing rate between the overlapped part and the one-sheet part was evaluated as in Example 1. As levels, B1 to B4 being invention examples and B5 being a comparative example were listed in Table 3.

TABLE 3

| | LEVEL | FIRST STEEL SHEET | | SECOND STEEL SHEET | | DIFFERENCE (W1 − W2) IN COATING WEIGHT BETWEEN STEEL SHEETS [g/m²] | (W1/W2)² × (t1/t2) | SHEET THICKNESS RATIO (t2/t1) BETWEEN STEEL SHEETS [—] | DIFFERENCE IN TEMPERATURE INCREASING RATE BETWEEN SUPERIMPOSED PART AND ONE-SHEET PART |
|---|---|---|---|---|---|---|---|---|---|
| | | PLATING COATING WEIGHT W1 [g/m²] | SHEET THICKNESS t1 [mm] | PLATING COATING WEIGHT W2 [g/m²] | SHEET THICKNESS t2 [mm] | | | | |
| INVENTION EXAMPLE | B1 | 80 | 2.0 | 40 | 2.0 | 40 | 4.0 | 1.0 | D |
| | B2 | 80 | 1.8 | 40 | 2.0 | 40 | 1.7 | 1.1 | D |
| | B3 | 80 | 1.6 | 40 | 2.0 | 40 | 2.0 | 1.3 | E |
| | B4 | 80 | 2.0 | 40 | 1.6 | 40 | 5.0 | 0.8 | C |

TABLE 3-continued

|  | LEVEL | FIRST STEEL SHEET | | SECOND STEEL SHEET | | DIFFERENCE (W1 − W2) IN COATING WEIGHT BETWEEN STEEL SHEETS [g/m$^2$] | (W1/ W2)$^2$ × (t1/t2) | SHEET THICKNESS RATIO (t2/t1) BETWEEN STEEL SHEETS [—] | DIFFERENCE IN TEMPERATURE INCREASING RATE BETWEEN SUPERIMPOSED PART AND ONE-SHEET PART |
|---|---|---|---|---|---|---|---|---|---|
|  |  | PLATING COATING WEIGHT W1 [g/m$^2$] | SHEET THICK-NESS t1 [mm] | PLATING COATING WEIGHT W2 [g/m$^2$] | SHEET THICK-NESS t2 [mm] |  |  |  |  |
| COMPARATIVE EXAMPLE | B5 | 80 | 0.8 | 40 | 2.3 | 40 | 1.4 | 2.9 | F |

Regarding the sheet thickness ratio (t2/t1) between the first steel sheet and the second sheet, it is found that B4 satisfying (t2/t1)≤0.9 is superior to B 1, B2, B3 in the difference in temperature increasing rate between the overlapped part and the one-sheet part. Further, B5 in which the value of (W1/W2)$^2$×(t1/t2) is less than 1.5 was bad in the difference in temperature increasing rate between the overlapped part and the second sheet.

Example 4

As listed in Table 4, a cold-rolled steel sheet through ordinary hot-rolling process and cold-rolling process as in Example 1 and having a steel component containing chemical components (by mass %, C: 0.31%, Si: 0.2%, Mn: 1.1%, P: 0.01%, S: 0.008%, Cr: 0.3%, Ti: 0.02%, B: 0.002%, the balance: Fe and impurities) was used as a sample material and the aluminum plating treatment was performed on its both faces on a Sendzimir hot-dip aluminum plating treatment line. In this event, the thickness of the aluminum-iron-based alloy layer was changed by adjusting the dipping time in the hot-dip aluminum plating bath. After the plating, the plating coating weight was adjusted by the gas wiping method, and then cooling was performed. The plating bath composition in this event was 93% Al-5% Si-2% Fe. Manufacture was performed with a sheet thickness and a plating coating weight as listed in Table 4, and a first steel sheet 27a of 300×240 mm and a second steel sheet 27b of 250×120 mm were prepared as illustrated in FIG. 5 by cutting and subjected to spot welding as illustrated at spots (welded parts 30) in FIG. 5 to produce an overlapped blank for hot stamping 27. This blank was subjected to hot stamping heating at 910° C. to investigate the temperature increasing rate, and immediately subjected to mold cooling, thereby obtaining an overlapped hot stamp molded body 31. Levels are listed in Table 4 with the invention examples indicated as C1 to C4. The metal mold is a metal mold with which a hat molded part having a shape and sizes illustrated in FIG. 6 can be obtained.

TABLE 4

|  | LEVEL | FIRST STEEL SHEET | | | SECOND STEEL SHEET | | |
|---|---|---|---|---|---|---|---|
|  |  | PLATING COATING WEIGHT W1 [g/m$^2$] | SHEET THICKNESS t1 [mm] | THICKNESS d1 OF ALUMINUM-IRON-BASED ALLOY LAYER [μm] | PLATING COATING WEIGHT W2 [g/m$^2$] | SHEET THICK-NESS t2 [mm] | THICKNESS d2 OF ALUMINUM-IRON-BASED ALLOY LAYER [μm] |
| INVENTION EXAMPLE | C1 | 80 | 2.0 | 5 | 40 | 2.0 | 5 |
|  | C2 | 80 | 2.0 | 3 | 40 | 2.0 | 6 |
|  | C3 | 80 | 2.0 | 3 | 40 | 2.0 | 8 |
|  | C4 | 80 | 2.0 | 2 | 40 | 2.0 | 10 |

|  | LEVEL | DIFFERENCE (W1 − W2) IN COATING WEIGHT BETWEEN STEEL SHEETS [g/m$^2$] | (W1/W2)$^2$ × (t1/t2) | SHEET THICKNESS RATIO (t2/t1) BETWEEN STEEL SHEETS [—] | DIFFERENCE (d2 − d1) IN THICKNESS BETWEEN ALUMINUM-IRON-BASED ALLOY LAYERS [μm] | DIFFERENCE IN TEMPERATURE INCREASING RATE BETWEEN SUPERIMPOSED PART AND ONE-SHEET PART |
|---|---|---|---|---|---|---|
| INVENTION EXAMPLE | C1 | 40 | 4.0 | 1.0 | 0 | D |
|  | C2 | 40 | 4.0 | 1.0 | 3 | C |
|  | C3 | 40 | 4.0 | 1.0 | 5 | C |
|  | C4 | 40 | 4.0 | 1.0 | 8 | C |

The results of the investigation about the difference in temperature increasing rate between the overlapped part and the one-sheet part of the blank were summarized in Table 4. Note that the evaluation criteria for the difference in temperature increasing rate between the overlapped part and the one-sheet part are the same as those in Example 1.

It is found that C2 to C4 being the invention examples in which the difference (d2−d1) between the thickness d1 of the aluminum-iron-based alloy layer of the first steel sheet 1 and the thickness d2 of the aluminum-iron-based alloy layer of the second steel sheet satisfies the relationship of 2≤(d2−d1)≤10 are inferior in the difference in temperature increasing rate between the overlapped part and the one-sheet part to C1 which does not satisfy the above relationship.

Example 5

As listed in Table 5, a cold-rolled steel sheet through ordinary hot-rolling process and cold-rolling process as in Example 1 and having a steel component containing chemical components (by mass %, C: 0.35%, Si: 0.2%, Mn: 0.6%, P: 0.01%, S: 0.008%, Cr: 0.3%, Ti: 0.02%, B: 0.002%, the balance: Fe and impurities) was used as a sample material and the aluminum plating treatment was performed on its both faces on a Sendzimir hot-dip aluminum plating treatment line. After the plating, the plating coating weight was adjusted by the gas wiping method, and then cooling was performed. Thereafter, coating of an aqueous coating solution containing a predetermined amount of carbon black, ZnO or $TiO_2$ was performed using a roll coater. The film thickness was obtained by observing the coating from the section under an optical microscope, and the film thickness of the carbon-based coating containing carbon black was 0.5 to 3 μm as listed in Table 5, and the coating weight of a single coating of ZnO, $TiO_2$ was 0.5 or 1.0 g/m². As the plating bath composition was 86% Al-12% Si-2% Fe. Manufacture was performed with a sheet thickness and a plating coating weight as listed in Table 5, and a first steel sheet 27a of 300×240 mm and a second steel sheet 27b of 250×120 mm were prepared as illustrated in FIG. 5 by cutting and subjected to spot welding as illustrated at the spots (welded parts 30) in FIG. 5 to produce an overlapped blank for hot stamping 27. This blank was subjected to hot stamping heating at 910° C. to investigate the temperature increasing rate, and immediately subjected to mold cooling, thereby obtaining an overlapped hot stamp molded body 31. Level are listed in Table 5 with the invention examples indicated as D1 to D10. The metal mold is a metal mold with which a hat molded part having a shape and sizes illustrated in FIG. 6 can be obtained.

TABLE 5

| | | FIRST STEEL SHEET | | | SECOND STEEL SHEET | | | | |
|---|---|---|---|---|---|---|---|---|---|
| | LEVEL | PLATING COATING WEIGHT W1 [g/m²] | SHEET THICKNESS t1 [mm] | THICKNESS d1 OF ALUMINUM-IRON-BASED ALLOY LAYER [μm] | PLATING COATING WEIGHT W2 [g/m²] | SHEET THICKNESS t2 [mm] | THICKNESS d2 OF ALUMINUM-IRON-BASED ALLOY LAYER [μm] | CARBON-BASED COATING ON PLATING SURFACE [μm] | EMISSIVITY ε OF PLATING SURFACE [—] |
| INVENTION EXAMPLE | D1 | 80 | 2.0 | 5 | 40 | 2.0 | 5 | 0.0 | 0.30 |
| | D2 | 80 | 2.0 | 5 | 40 | 2.0 | 5 | 0.5 | 0.80 |
| | D3 | 80 | 2.0 | 5 | 40 | 2.0 | 5 | 1.0 | 0.95 |
| | D4 | 80 | 2.0 | 5 | 40 | 2.0 | 5 | 3.0 | 1.00 |
| | D5 | 80 | 2.0 | 5 | 40 | 2.0 | 5 | 0.0 | 0.50 |
| | D6 | 80 | 2.0 | 5 | 40 | 2.0 | 5 | 0.0 | 0.50 |
| | D7 | 80 | 2.0 | 5 | 40 | 2.0 | 5 | 3.0 | 1.00 |
| | D8 | 80 | 2.0 | 5 | 40 | 2.0 | 5 | 3.0 | 1.00 |
| | D9 | 80 | 2.0 | 5 | 40 | 2.0 | 5 | 0.0 | 0.50 |
| | D10 | 80 | 2.0 | 5 | 40 | 2.0 | 5 | 3.0 | 1.00 |

| | LEVEL | SECOND STEEL SHEET ZnO, $TiO_2$ COATING AMOUNT ON PLATING SURFACE [g/m²] | DIFFERENCE (W1 − W2) IN COATING WEIGHT BETWEEN STEEL SHEETS [g/m²] | $(W1/W2)^2 \times (t1/t2)$ | SHEET THICKNESS RATIO (t2/t1) BETWEEN STEEL SHEETS [—] | DIFFERENCE (d2 − d1) IN THICKNESS BETWEEN ALUMINUM-IRON-BASED ALLOY LAYERS [μm] | DIFFERENCE IN TEMPERATURE INCREASING RATE BETWEEN SUPERIMPOSED PART AND ONE-SHEET PART |
|---|---|---|---|---|---|---|---|
| INVENTION EXAMPLE | D1 | 0 | 40 | 4.0 | 1.0 | 0 | D |
| | D2 | 0 | 40 | 4.0 | 1.0 | 0 | B |
| | D3 | 0 | 40 | 4.0 | 1.0 | 0 | B |
| | D4 | 0 | 40 | 4.0 | 1.0 | 0 | B |
| | D5 | ZnO: 1.0 | 40 | 4.0 | 1.0 | 0 | B |
| | D6 | $TiO_2$: 1.0 | 40 | 4.0 | 1.0 | 0 | B |
| | D7 | ZnO: 0.5 | 40 | 4.0 | 1.0 | 0 | A |
| | D8 | $TiO_2$: 0.5 | 40 | 4.0 | 1.0 | 0 | A |
| | D9 | ZnO: 0.5, $TiO_2$: 0.5 | 40 | 4.0 | 1.0 | 0 | B |
| | D10 | ZnO: 0.5, $TiO_2$: 0.5 | 40 | 4.0 | 1.0 | 0 | A |

The results of the investigation about the difference in temperature increasing rate between the overlapped part and the one-sheet part of the blank were summarized in Table 5. Note that the evaluation criteria for the difference in temperature increasing rate between the overlapped part and the one-sheet part are the same as those in Example 1.

It is found that D2 to D4 being the invention examples in which the second steel sheet has a carbon-based coating having an emissivity of 0.7 or more on the surface of the aluminum-based plated layer formed on the surface not in contact with the first steel sheet are superior in the difference in temperature increasing rate between the overlapped part and the one-sheet part to D1 having no carbon-based coating. It is further found that D5, D6, D9 being the invention examples having a coating composed of at least one of ZnO, $TiO_2$ and a coating weight of 0.2 g/m² or more on the surface of the aluminum-based plated layer formed on the surface of the second steel sheet are superior similarly in the difference in temperature increasing rate between the overlapped part and the one-sheet part to D1 not satisfying it. It is found that D7, D8, D10 having both the carbon-based coating and the coating composed of at least one of ZnO, $TiO_2$ are further superior to D1 to D6, D9.

Example 6

About the overlapped hot stamp molded bodies in A8, A9, A13 (heating condition: 910° C.×7 min) obtained in Example 1, the corrosion resistance regarding the corrosion thinning was investigated. More specifically, sample materials in each of which an alloyed hot-dip aluminum plated steel sheet GA (1.2t) having a plating coating weight on one face of 45 g/m² was spot welded at three locations on one side, 6 locations in total on both of the flange parts of the overlapped hot stamp molded body in A8, A9, A13 were prepared. Then, each of the sample materials was corroded for 60 days in conformity to CCT-JASO610 specified in Japanese Automotive Standards Organization JASO610. Thereafter, the corrosion thinning on the A8, A9, A13 side of the welded mated part after corrosion was measured. As a result of this, A8, A9 were superior (accepted) in degree of the corrosion thinning (sheet reduction) to the GA material of the welding mating material, whereas A13 was inferior (rejected) in degree of the corrosion thinning (sheet reduction) to the GA material of the welding mating material. Note that the average plating thickness (K1) of the first steel sheet, plating thickness (K1) of the second steel sheet, and sheet thicknesses (T1, T2) in the molded bodies in A8, A9, A13 before corrosion are as listed in the following Table 6. Note that the reason why the sheet reduction of the welding mating part of the flange part was confirmed in the corrosion resistance evaluation is that the solution for the electrodeposition coating generally treated when the hot stamp molded body is used for the automobile difficult to enter the welding mating part and the welding mating part is positioned as a place likely to corrode. For the purpose of simulating the difficulty of entrance, the electrodeposition coating is not performed in the evaluation of the corrosion resistance in Example 6.

EXPLANATION OF CODES 1 first steel sheet
1a face in contact with second steel sheet of first steel sheet
1b face not in contact with second steel sheet of first steel sheet
2 second steel sheet
2a face in contact with first steel sheet of second steel sheet
2b face not in contact with first steel sheet of second steel sheet
3 welded part
4 overlapped blank for hot stamping
4a overlapped part of overlapped blank for hot stamping
4b one-sheet part of overlapped blank for hot stamping
5 heating furnace for hot stamping
6 press metal mold for hot stamping
7 head top part
8 bent part on head top part side
9 bent part on flange side
10 vertical wall part
11 flange part
12 overlapped hot stamp molded body
13 surface on one side of aluminum-based plated steel sheet
14 aluminum layer
15 aluminum-iron-based alloy layer
16 base material
17 carbon-based coating
17' coating layer containing at least one of ZnO and $TiO_2$
18 surface on one side of plated steel sheet having carbon-based coating on surface of aluminum-based plated layer
18' surface on one side of plated steel sheet having coating layer containing at least one of ZnO and $TiO_2$ on surface of aluminum-based plated layer
19 welded part (spot) at head top part
20 welded part (spot) at bent part
21 welded part (spot) at vertical wall part
22 overlapped blank for hot stamping
23 welded part (spot) at head top part after molding
24 welded part (spot) at bent part after molding
25 welded part (spot) at vertical wall part after molding
26 overlapped hot stamp molded body

TABLE 6

|  |  | FIRST STEEL SHEET | | SECOND STEEL SHEET | | PLATING THICKNESS | |
|---|---|---|---|---|---|---|---|
|  | LEVEL | PLATING THICKNESS K1 [μm] | SHEET THICKNESS T1 [mm] | PLATING THICKNESS K2 [μm] | SHEET THICKNESS T2 [mm] | DIFFERENCE (K1 − K2) [μm] | $(K1/K2)^2 \times (T1/T2)$ |
| INVENTION EXAMPLE | A8 | 40 | 2 | 15 | 2 | 25 | 7.1 |
|  | A9 | 41 | 2 | 18 | 2 | 23 | 5.2 |
| COMPARATIVE EXAMPLE | A13 | 42 | 2 | 35 | 2 | 7 | 1.4 |

Preferred embodiments of the present invention have been described above with reference to the accompanying drawings, but the present invention is not limited to the embodiments. It should be understood that various changes and modifications are readily apparent to those skilled in the art within the scope of the technical spirit as set forth in claims, and those should also be covered by the technical scope of the present invention.

27 overlapped blank for hot stamping
27a first steel sheet of overlapped blank for hot stamping
27b second steel sheet of overlapped blank for hot stamping
28 position of one-sheet part where thermocouple is attached
29 position of overlapped part where thermocouple is attached 30 welded part
31 overlapped hot stamp molded body

What is claimed is:

1. An overlapped blank for hot stamping comprising:
a first steel sheet; and
at least one second steel sheet connected to a surface of the first steel sheet via a welding point and smaller in area than the first steel sheet, wherein:
the first steel sheet is a plated steel sheet having an aluminum-based plated layer on both faces of the first steel sheet, and the second steel sheet is a plated steel sheet having an aluminum-based plated layer on both faces of the second steel sheet;
a coating weight of the aluminum-based plated layer on the first steel sheet is W1 ($g/m^2$) in terms of an average coating weight on both the faces;
a coating weight of the aluminum-based plated layer on a surface on a side not in contact with the first steel sheet in the second steel sheet is W2 ($g/m^2$); and
each of the W1 and the W2 is within a range of 20 $g/m^2$ or more and 120 $g/m^2$ or less, and satisfies relationships of following Expression (1) and Expression (2), $$30 \leq (W1-W2) \leq 100 \quad \text{Expression (1)}$$

$$(W1/W2)^2 \times (t1/t2) \geq 1.5 \quad \text{Expression (2)}$$

where t1 (mm) is a sheet thickness of the first steel sheet and t2 (mm) is a sheet thickness of the second steel sheet in the Expression (2).

2. The overlapped blank for hot stamping according to claim 1, wherein:
the welding is spot welding; and
a spot density of the spot welding is 1 spot/200 $cm^2$ or more.

3. The overlapped blank for hot stamping according to claim 2, wherein:
the first steel sheet has a portion which becomes a flange part composed only of the first steel sheet after supplied for hot stamp molding;
at least a part of an overlapped part of the first steel sheet and the second steel sheet has a portion which becomes a bent part after supplied for the hot stamp molding; and
at least one spot of the spot welding exists at the portion which becomes the bent part after the hot stamp molding.

4. The overlapped blank for hot stamping according to claim 1, wherein the sheet thickness t1 (mm) of the first steel sheet and the sheet thickness t2 (mm) of the second steel sheet satisfy a relationship of following Expression (3), $$(t2/t1) \leq 2.0 \quad \text{Expression (3)}.$$

5. The overlapped blank for hot stamping according to claim 1, wherein the aluminum-based plated layer provided on each of the first steel sheet and the second steel sheet has a two-layer structure of an aluminum layer and an aluminum-iron-based alloy layer in order from a surface toward a base material steel sheet, and a thickness d1 (µm) of the aluminum-iron-based alloy layer of the first steel sheet and a thickness d2 (µm) of the aluminum-iron-based alloy layer of the second steel sheet satisfy a relationship of following Expression (4), $$2 \leq (d2-d1) \leq 10 \quad \text{Expression (4)}.$$

6. The overlapped blank for hot stamping according to claim 1, wherein the second steel sheet further comprises a carbon-based coating having an emissivity of 0.7 or more on the surface of the aluminum-based plated layer on the side not in contact with the first steel sheet.

7. The overlapped blank for hot stamping according to claim 1, further comprising a coating composed of at least one of ZnO and $TiO_2$ and having a coating weight per one face of 0.2 $g/m^2$ or more, on the surface of the aluminum-based plated layer located on a surface of the second steel sheet.

8. A method of manufacturing an overlapped hot stamp molded body, the method comprising:
heating an overlapped blank for hot stamping, the overlapped blank for hot stamping comprising:
a first steel sheet; and
at least one second steel sheet connected to a surface of the first steel sheet via a welding point and smaller in area than the first steel sheet, wherein:
the first steel sheet is a plated steel sheet having an aluminum-based plated layer on both faces of the first steel sheet, and the second steel sheet is a plated steel sheet having an aluminum-based plated layer on both faces of the second steel sheet;
a coating weight of the aluminum-based plated layer on the first steel sheet is W1 ($g/m^2$) in terms of an average coating weight on both the faces;
a coating weight of the aluminum-based plated layer on a surface on a side not in contact with the first steel sheet in the second steel sheet is W2 ($g/m^2$); and
each of the W1 and the W2 is within a range of 20 $g/m^2$ or more and 120 $g/m^2$ or less, and satisfies relationships of following Expression (1) and Expression (2); and
in hot stamp molding of molding after the heating, providing a bent part subjected to bending at least a part of an overlapped part of the first steel sheet and the second steel sheet, $$30 \leq (W1-W2) \leq 100 \quad \text{Expression (1)}$$

$$(W1/W2)^2 \times (t1/t2) \geq 1.5 \quad \text{Expression (2)}$$

where t1 (mm) is a sheet thickness of the first steel sheet and t2 (mm) is a sheet thickness of the second steel sheet in the Expression (2).

9. The method of manufacturing an overlapped hot stamp molded body according to claim 8, wherein:
the welding is spot welding; and
a spot density of the spot welding is 1 spot/200 $cm^2$ or more.

10. The method of manufacturing an overlapped hot stamp molded body according to claim 9, wherein at least one spot of the spot welding exists at a portion which becomes the bent part after the hot stamp molding.

11. The method of manufacturing an overlapped hot stamp molded body according to claim 8, wherein the sheet thickness t1 (mm) of the first steel sheet and the sheet thickness t2 (mm) of the second steel sheet satisfy a relationship of following Expression (3), $$(t2/t1) \leq 2.0 \quad \text{Expression (3)}.$$

12. The method of manufacturing an overlapped hot stamp molded body according to claim 8, wherein the aluminum-based plated layer provided on each of the first steel sheet and the second steel sheet has a two-layer structure of an aluminum layer and an aluminum-iron-based alloy layer in order from a surface toward a base material steel sheet, and a thickness d1 (μm) of the aluminum-iron-based alloy layer of the first steel sheet and a thickness d2 (μm) of the aluminum-iron-based alloy layer of the second steel sheet satisfy a relationship of following Expression (4), $$2 \leq (d2-d1) \leq 10 \qquad \text{Expression (4).}$$

13. The method of manufacturing an overlapped hot stamp molded body according to claim 8, wherein the second steel sheet further comprises a carbon-based coating having an emissivity of 0.7 or more on the surface of the aluminum-based plated layer on the side not in contact with the first steel sheet.

14. The method of manufacturing an overlapped hot stamp molded body according to claim 8, wherein a coating composed of at least one of ZnO and $TiO_2$ and having a coating weight per one face of 0.2 g/m² or more is further provided on the surface of the aluminum-based plated layer located on a surface of the second steel sheet.

15. An overlapped hot stamp molded body comprising:
a first steel sheet having a sheet thickness of T1 (mm); and
at least one second steel sheet connected to a surface of the first steel sheet via a welding point, smaller in area than the first steel sheet, and having a sheet thickness of T2 (mm), wherein:
the first steel sheet is a plated steel sheet having an aluminum-based plated layer having an average plating thickness of K1 (μm) on both faces on both the faces of the first steel sheet;
the second steel sheet is a plated steel sheet having an aluminum-based plated layer having a plating thickness of K2 (μm) on a surface on a side not in contact with the first steel sheet; and
relationships of following Expression (11) and Expression (12) are satisfied $$10 \leq (K1-K2) \leq 33 \qquad \text{Expression (11)}$$

$$(K1/K2)^2 \times (T1/T2) \geq 1.5 \qquad \text{Expression (12).}$$

* * * * *